United States Patent
Maitland et al.

(10) Patent No.: US 7,386,203 B2
(45) Date of Patent: Jun. 10, 2008

(54) SYSTEM FOR DIFFUSING LIGHT FROM AN OPTICAL FIBER OR LIGHT GUIDE

(75) Inventors: Duncan J. Maitland, Pleasant Hill, CA (US); Ward Small, IV, Livermore, CA (US); Thomas S. Wilson, San Leandro, CA (US); William J. Benett, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 11/489,138

(22) Filed: Jul. 18, 2006

(65) Prior Publication Data

US 2008/0019657 A1 Jan. 24, 2008

Related U.S. Application Data

(63) Continuation-in-part of application No. 11/172,668, filed on Jun. 30, 2005.

(51) Int. Cl.
G02B 6/26 (2006.01)
G02B 6/00 (2006.01)

(52) U.S. Cl. ............................ 385/27; 385/15; 385/141

(58) Field of Classification Search ................. 385/15, 385/27, 141
See application file for complete search history.

(56) References Cited

U.S. PATENT DOCUMENTS

| | | | |
|---|---|---|---|
| 5,151,096 A | 9/1992 | Khoury | |
| 5,207,669 A | 5/1993 | Baker et al. | |
| 5,337,381 A | 8/1994 | Biswas et al. | |
| 5,344,419 A | 9/1994 | Spears | |
| 5,363,458 A | 11/1994 | Pan et al. | |
| 5,429,635 A | 7/1995 | Purcell, Jr. et al. | |
| 5,431,647 A | 7/1995 | Purcell, Jr. et al. | |
| 5,632,767 A | 5/1997 | Sinofsky | |
| 5,871,521 A | 2/1999 | Kaneda et al. | |
| 5,908,415 A | 6/1999 | Sinofsky | |
| 5,946,441 A | 8/1999 | Esch | |
| 6,004,315 A | 12/1999 | Dumont | |
| 6,270,492 B1 | 8/2001 | Sinofsky | |
| 6,361,180 B1 | 3/2002 | Iimura | |
| 6,361,530 B1 | 3/2002 | Mersch | |
| 6,364,874 B1 | 4/2002 | Bays et al. | |
| 6,418,252 B1 * | 7/2002 | Maitland | 385/31 |
| 6,565,526 B2 * | 5/2003 | Seward | 604/93.01 |
| 6,576,163 B2 | 6/2003 | Mersch | |
| 6,663,821 B2 * | 12/2003 | Seward | 264/512 |
| 6,740,094 B2 * | 5/2004 | Maitland et al. | 606/108 |
| 6,754,717 B1 | 6/2004 | Day, III et al. | |
| 6,829,411 B2 | 12/2004 | Easley | |
| 2002/0013555 A1 * | 1/2002 | Seward | 604/247 |
| 2002/0094161 A1 * | 7/2002 | Maitland | 385/31 |

(Continued)

Primary Examiner—Kianni C Kaveh
(74) Attorney, Agent, or Firm—Eddie E. Scott; John H. Lee

(57) ABSTRACT

A system for diffusing light from an optical fiber wherein the optical fiber is coupled to a light source, comprising forming a polymer element adapted to be connected to the optical fiber and incorporating a scattering element with the polymer element wherein the scattering element diffuses the light from the polymer element. The apparatus of the present invention comprises a polymer element operatively connected to the optical fiber and a scattering element operatively connected with the shape polymer element that diffuses the light from the polymer element.

42 Claims, 15 Drawing Sheets

U.S. PATENT DOCUMENTS

2002/0095169 A1* 7/2002 Maitland et al. ............... 385/31
2003/0181853 A1* 9/2003 Seward .................... 604/93.01
2004/0133231 A1* 7/2004 Maitland et al. ............ 606/200
2006/0009785 A1* 1/2006 Maitland et al. ............ 606/113

* cited by examiner

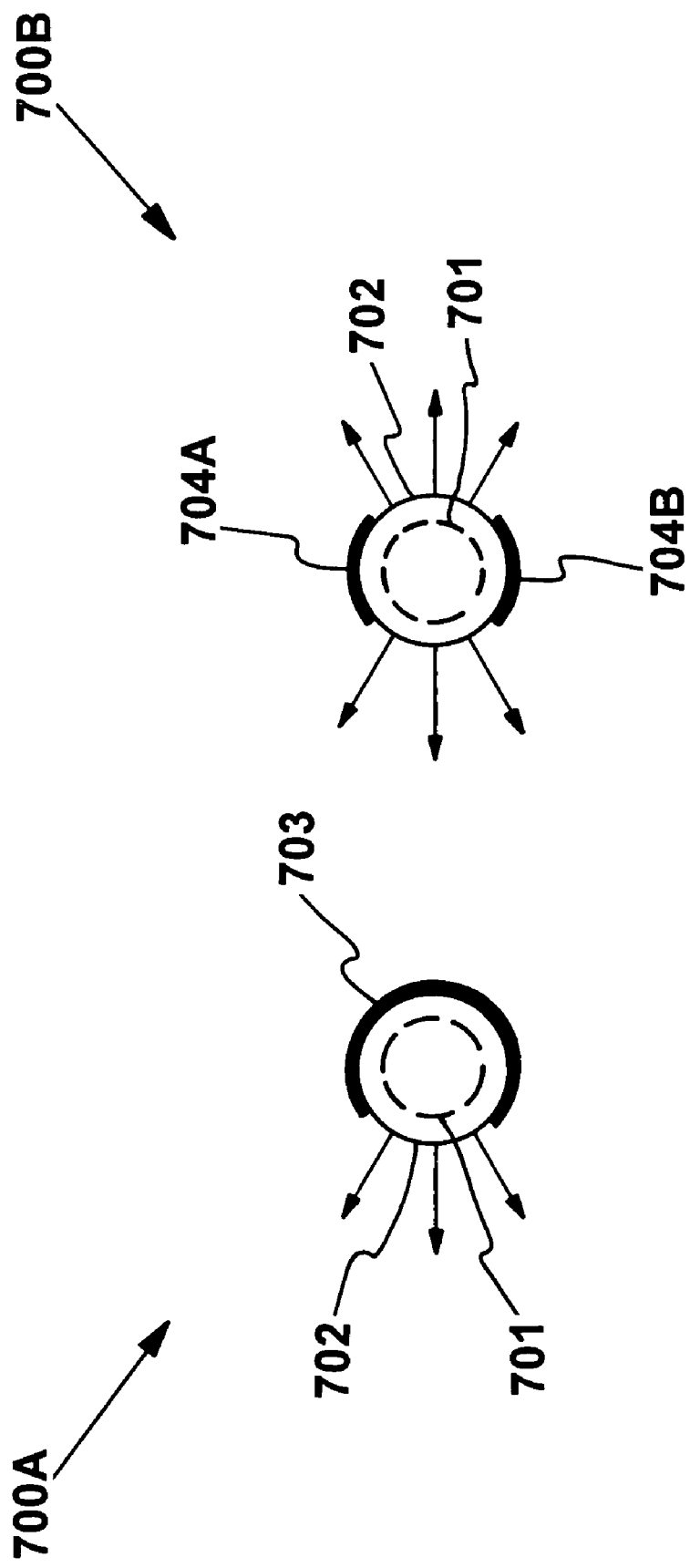

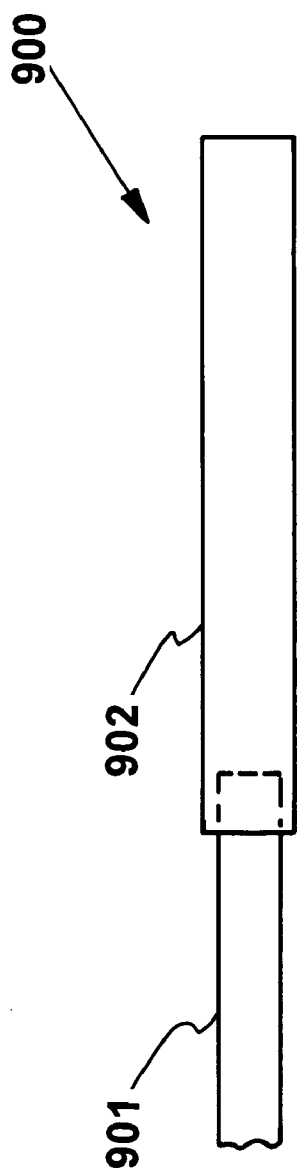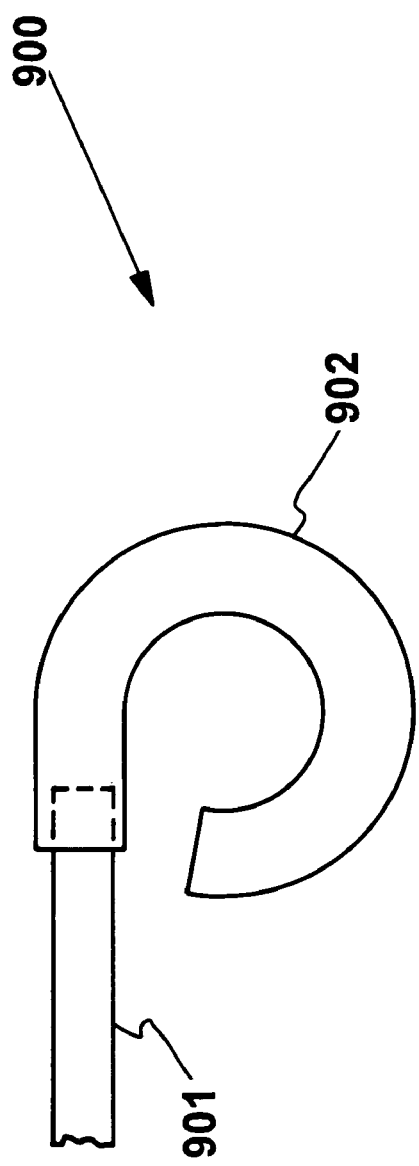

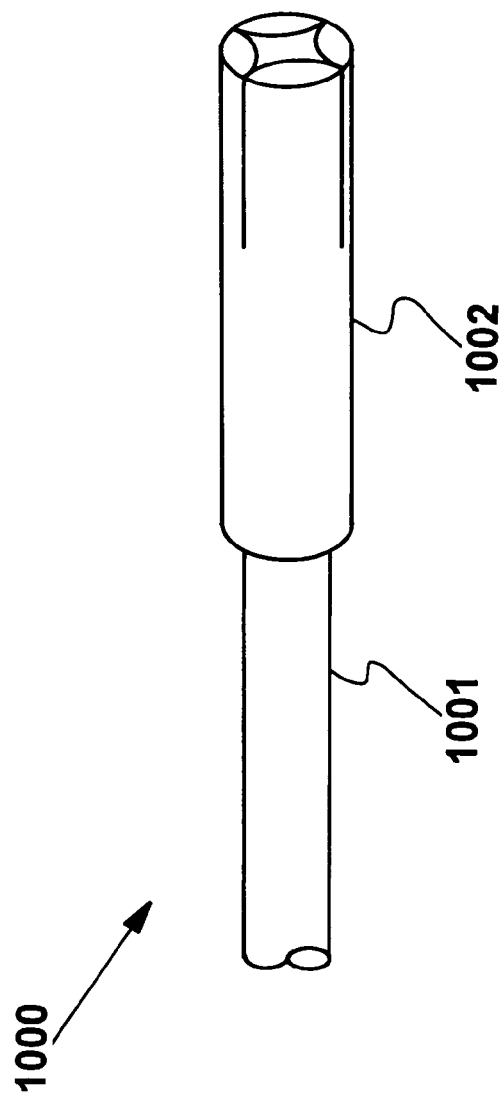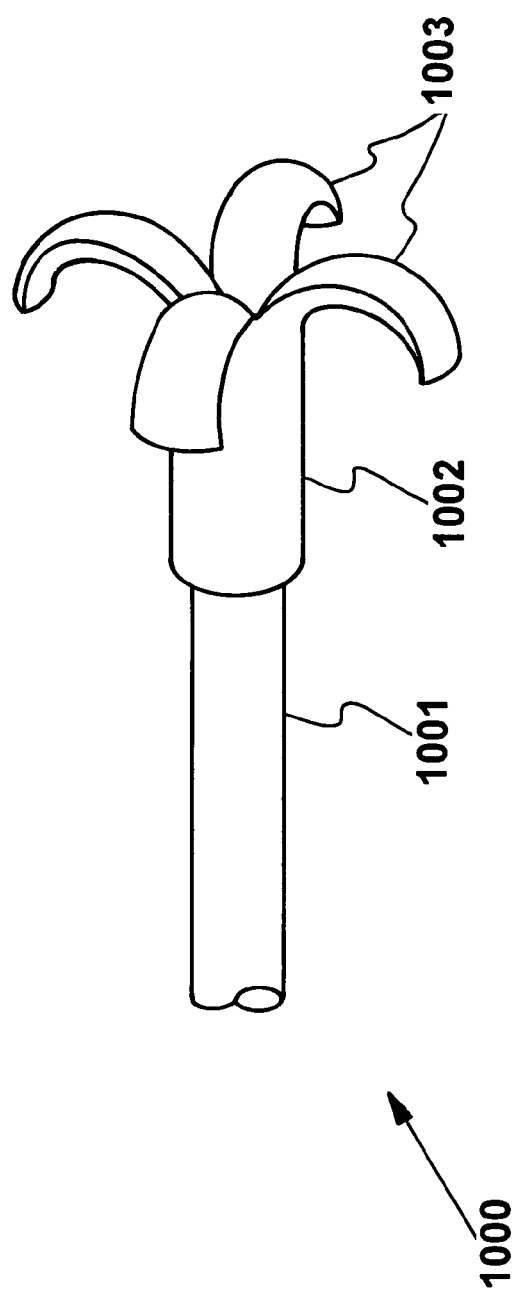

SYSTEM FOR DIFFUSING LIGHT FROM AN OPTICAL FIBER OR LIGHT GUIDE

CROSS-REFERENCE TO RELATED APPLICATIONS

This application is a Continuation-in-Part of Co-Pending U.S. patent application Ser. No. 11/172,668 by Duncan Maitland, William J. Benett, Jane P. Bearinger, Thomas S. Wilson, Ward Small IV, Daniel L. Schumann, Wayne A. Jensen, Jason M. Ortega, John E. Marion III, and Jeffrey M. Loge, filed Jun. 30, 2005, titled, "SHAPE MEMORY POLYMER MEDICAL DEVICE." Co-Pending U.S. patent application Ser. No. 11/172,668 was published as U.S. patent application No. 2006/0009785 on Jan. 12, 2006. U.S. patent application Ser. No. 11/172,668 filed Jun. 30, 2005, titled, "SHAPE MEMORY POLYMER MEDICAL DEVICE" is incorporated herein in its entirety by this reference.

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to a light diffusing system and more particularly to a system for diffusing light from an optical fiber or light guide.

2. State of Technology

U.S. Pat. No. 6,829,411 for a wide angle light diffusing optical fiber tip, by James C. Easley, patented Dec. 7, 2004, provides the following description: "A diffusing optical fiber tip yielding a homogenous output pattern having a total illumination angle of at least 180 degrees. The diffusing optical fiber tip has an outer diameter which is no greater than that of the optical fiber, and appears as a point source of illumination, having substantially the same output pattern when immersed in water as it does in air. The diffusing optical fiber tip is manufactured on the end of a typical acrylic optical fiber by causing longitudinal stresses in the fiber end, which are then relieved by forming axial cracks in the fiber core at the optical fiber tip. As a result, light exiting the optical fiber must traverse a scrambled pathway caused by a complex interaction of reflections and refractions, yielding wide angle diffuse illumination."

U.S. Pat. No. 6,576,163 for a durable fiber optic diffuser tip and method of making same, by Steven H. Mersch, patented Jun. 10, 2003, provides the following description: "A method of manufacturing a medical instrument for diffusing light from an optical fiber is provided. The medical instrument includes an optical fiber having a proximal portion including a cladding layer surrounding the core and a distal portion having a diffuser tip comprising a protective coating made of acrylic or methylpentene surrounding the core, an optical coupling layer, and a sleeve. The protective coating strengthens the distal end of the optical fiber so that it can withstand a higher bending moment at failure than the uncladded core. At the same time, the protective layer has an index of refraction that is between the indices of refraction of the core and the optical coupling layer to direct light out of the core through to the optical coupling layer."

U.S. Pat. No. 6,418,252 for a light-diffusing fiber optic chamber, by Duncan J. Maitland, patented Jul. 9, 2002, provides the following description: "A light diffusion system for transmitting light to a target area. The light is transmitted in a direction from a proximal end to a distal end by an optical fiber. A diffusing chamber is operatively connected to the optical fiber for transmitting the light from the proximal end to the distal end and transmitting said light to said target area. A plug is operatively connected to the diffusing chamber for increasing the light that is transmitted to the target area."

U.S. Pat. No. 6,364,874 for a device for irradiating internal cavities of the body, by Bays et al, patented Apr. 2, 2002, provides the following description: "A device for the irradiation of internal cavities of the body includes a flexible catheter, made of a transparent material, containing a fiber optic of which the section at one end is designed to radially diffuse light coming from a source arranged at the other end. An inflatable balloon fixed to one end of the catheter surrounds the diffusing section of the fiber optic. The balloon is made of an elastomeric material that diffuses the light and is prefabricated by molding based on the shape of the cavity to be treated. The balloon presses against the cavity wall and, with the thickness of its surfaces remaining constant after inflation, the pressure needed for inflation is low and cannot damage the cavity tissues."

U.S. Pat. No. 6,361,530 for a durable fiber optic diffuser tip and method of making same, by Steven H. Mersch, patented Mar. 26, 2002, provides the following description: "An medical instrument for diffusing light from an optical fiber is provided. The medical instrument includes an optical fiber having a proximal portion including a cladding layer surrounding the core and a distal portion having a diffuser tip comprising a protective coating made of acrylic or methylpentene surrounding the core, an optical coupling layer, and a sleeve. The protective coating strengthens the distal end of the optical fiber so that it can withstand a higher bending moment at failure than the uncladded core. At the same time, the protective layer has an index of refraction that is between the indices of refraction of the core and the optical coupling layer to direct light out of the core through to the optical coupling layer."

U.S. Pat. No. 6,361,180 for a light diffusing apparatus using light guide, by Keiji Iimura, patented Mar. 26, 2002, provides the following description: "A light diffusing apparatus using light guide comprises at least first light guide portion for light leakage, second light guide portion solely for light transmission; and third light guide portion for an optical communication with first and second light guide portion. The first light guide portion has first end (or side surface) and second light guide portion has second end which is optically opposed to the first end. The third light guide portion forms substantially non-linear (or curved) cross-section and the first, second and third light guide portions form substantially a single-piece construction. At least a single transparent panel-like member (or, sheet-like, plate-like or film-like member) may be used for the first, second and third light guide portions. At least a ribbon-like optical fiber cable (i.e. tape-like or film-like optical fiber cable) may be used for the first, second and third light guide portions, having a plurality of optical fibers which are aligned in parallel each other. The light diffusing apparatus can output light with a desired predetermined distribution pattern of surface brightness i.e. luminance. The distribution pattern of output light may produce uniform i.e. even surface brightness i.e. luminance. Therefore, the light diffusing apparatus may be suitably used typically in surface light sources, photographic film viewers, backlights or front lights of passive displays such as liquid crystal displays, light indicators and vehicle lights, etc."

U.S. Pat. No. 6,270,492 for a photothereapeutic apparatus with diffusive tip assembly, by Edward L. Sinofsky, patented Aug. 7, 2001, provides the following description: "An optical transmissive, light-diffusing, fiber tip assembly having a radiation-scattering particles incorporated therein and a reflective end surface is disclosed for use in phototherapy. As radiation propagates through the fiber tip, a portion of the radiation is scattered in a cylindrical (or partially cylindrical) pattern along the length of the fiber tip. Radiation which is not scattered during this initial pass through the tip is reflected by at least one surface of the assembly and returned through the tip. During this second pass, the remaining radiation (or at least a major portion of this returning radiation) again encounters the scatterers which provide further radial diffusion of the radiation. Preferably, the scattering medium and the reflective end cap interact to provide a substantially uniform axial distribution of laser radiation over the length of the tip apparatus. Methods and devices are also disclosed in which a dielectric structure is operatively coupled to photothereapeutic instrument to reflect light without substantial heating. The invention is particularly useful in light diffusive tip assemblies for phototherapy that have components which increase in temperature after prolonged exposure to light, such as mirrors and metallic structures incorporated into such diffusers to facilitate radiographic or fluoroscopic imaging during a therapeutic procedure."

U.S. Pat. No. 6,004,315 for an optical fiber diffuser and method of making, by Michael G. Dumont, patented Dec. 21, 1999, provides the following description: "An optical fiber device includes a polymeric optical fiber having a proximal end for coupling to a source of light, and a diffusing region. The polymeric optical fiber includes a core and a cladding around the core. The diffusing region includes a length of the polymeric optical fiber in which the cladding is partially removed to expose the core and in which the exposed core and the remaining cladding have a roughened surface for outwardly diffusing light carried through the polymeric optical fiber. The diffusing region is preferably formed by abrasion, for example by directing a particle jet at the optical fiber while rotating and translating the optical fiber with respect to the particle jet. The particle jet may include microscopic glass beads which roughen the optical fiber core. The density of scattering sites may be varied along the length of the diffusing region to produce a desired light output pattern. The optical fiber device is useful in medical applications, including as a component of catheter or endoscopic systems."

U.S. Pat. Nos. 5,754,717 and 5,946,441 for a light-diffusing device for an optical fiber, methods of producing and using same, and apparatus for diffusing light from an optical fiber, by Victor C. Esch, patented May 19, 1998, and Aug. 31, 1999, respectively, provide the following description: "A diffusing tip is provided for diffusing light from a light-emitting end of an optical fiber in a radial distribution pattern relative to the axis of the tip and along a length of the tip. The tip has an inner core and an outer covering which define a light guide. The outer covering is modified on its interior surface adjacent to the core such that light transmitted down the light guide is removed from the core upon encountering a surface modification on the interior surface. The light so removed is transmitted to the outer surface along the length of the tip, where it can be used to irradiate a selected object or material. The diffusing tip preferably provides light in a substantially uniform intensity distribution for the substantially uniform irradiation of a selected object or material."

U.S. Pat. No. 5,908,415 for phototherapy methods and apparatus, by Edward L. Sinofsky, patented Jun. 1, 1999, provides the following description: "An optical transmissive fiber tip assembly having a radiation-scattering particles incorporated therein and a reflective end surface is disclosed for use in phototherapy. As radiation propagates through the fiber tip, a portion of the radiation is scattered in a cylindrical (or partially cylindrical) pattern along the length of the fiber tip. Radiation which is not scattered during this initial pass through the tip is reflected by at least one surface of the assembly and returned through the tip. During this second pass, the remaining radiation (or at least a major portion of this returning radiation) again encounters the scatterers which provide further radial diffusion of the radiation. In one embodiment, a diffusive tip assembly is disclosed for diffusing radiation from an optical fiber. The tip assembly is adapted to receive the distal end of said fiber in order to direct the radiation outward, and includes a light transmissive tube or housing aligned with the distal end of the fiber. The tube includes a reflective end cap and a light scattering medium disposed therein such that radiation propagating through said fiber enters the scattering medium and a portion of the radiation is scattered outward through said tube, and another portion passes through the scattering medium and is reflected by the end cap for retransmission through said scattering medium. Preferably, the scattering medium and the reflective end cap interact to provide a substantially uniform axial distribution of laser radiation over the length of the tip apparatus."

U.S. Pat. No. 5,871,521 for a laser probe for medical treatment, by Kaneda et al, patented Feb. 16, 1999, provides the following description: "A medical laser probe to be used as a laser irradiation unit in laser treatment that is performed by irradiating a living body with laser light. The laser probe irradiates laser light uniformly, utilizing laser light effectively by concentration thereof, achieving limited irradiation of laser light and taking countermeasures against stains forming on the probe. The laser probe is provided with (1) a transparent light diffuser for radiating laser light received by a light-guide fiber in the direction along the longitudinal axis of the light diffuser and in radial directions from this axis to the peripheral side surface thereof and (2) a detachable protective diffusion tube for further diffusing laser light radiated from the transparent light diffuser. A reflector may be provided between the light diffuser and the diffusion tube. Further, shielding plates may be provided on the protective diffusion tube."

U.S. Pat. No. 5,632,767 for loop diffusers for diffusion of optical radiation, by Edward L. Sinofsky, patented May 27, 1997, provides the following description: "Methods and apparatus are disclosed for diffusing radiation from a optical fiber to provide a larger exposure area for phototherapy and to provide a substantially uniform energy distribution to a major portion of the exposure area. The invention is especially useful in constructing and implementing circumferential and/or sideways-emitting diffusive tip assemblies, or quasi-spherical diffusive tip assemblies for optical fibers to direct laser radiation in a radially outward pattern relative to the fiber's axis. In one aspect of the invention, a plurality of optically-transmissive fiber tip assemblies are employed to act as diffusers. The two or more fiber tip assemblies are deployed as loops which create a uniform illumination pattern. By 'looping' or 'folding' the fibers, a plurality of fibers can be deployed in conjunction with one another to create geometric exposure patterns with increased energy density while still avoiding 'hot spots.'"

U.S. Pat. No. 5,431,647 for a fiberoptic cylindrical diffuser, by Purcell, Jr. et al, patented Jul. 11, 1995, provides the following description: "A fiberoptic diffuser has an optical fiber having a light transmitting core, cladding about the core, and a buffer layer about the cladding. The core at the distal end portion of the fiber is exposed and a diffusing sleeve is disposed thereabout. A transparent cylindrical cap is disposed outwardly of the diffusing sleeve and overlies the exposed core, and a reflector is provided in the cap in axial alignment with the distal end of the core to reflect light rays exiting the core. The light rays exiting the core are reflected by the reflector and are refracted by the sleeve to exit through the cap over substantially the entire length of the exposed core."

U.S. Pat. No. 5,429,635 for a fiberoptic spherical diffuser, by Purcell, Jr. et al, patented Jul. 4, 1995, provides the following description: "A fiberoptic diffuser for photodynamic therapy applications comprises an optical fiber having a light transmitting core, cladding about the core, and a buffer layer about the cladding. The distal end portion of the fiber core is free from the cladding and buffer layer, and the exposed distal end of the core has a conical configuration. A cap extends about the distal end portion of the fiber and has a spheroidal end portion of light diffusing material which extends about the exposed conical end of the fiber core. The cap also has a mounting portion engaged with the buffer layer of the fiber, and it provides a cavity in which the exposed core is disposed. Light rays passing through the fiber to its distal end are refracted outwardly at the conical end of the core into the spheroidal end portion of the cap and are further refracted by the cap to exit therefrom over substantially the entire surface of the spheroidal end portion."

U.S. Pat. No. 5,363,458 for a fiber optic light diffuser, by Pan et al, patented Nov. 8, 1994, provides the following description: "Heat and light generating, fiber optic, cylindrical diffusers are structured to operate more efficiently and with increased uniformity by the inclusion of rings of prescribed indicies of refraction about the unclad distal end portion of the diffuser. Such a diffuser also includes a conical distal tip. A sealed Teflon™ sleeve containing diffusing material in place over the entire length of the diffuser also improves the uniformity of heat distribution."

U.S. Pat. No. 5,344,419 for an apparatus and method for making a diffusing tip in a balloon catheter system, by James R. Spears, patented Sep. 6, 1994, provides the following description: "An apparatus and method are disclosed for making a laser balloon catheter having a diffusing tip for propagating a uniform cylindrical pattern of laser energy. Included in the catheter are an elongated flexible tube with an inflatable balloon connected to the tube and means for inflating and deflating the balloon. A central channel is disposed within the balloon and coupled to the tube. An optical fiber with the diffusing tip at its distal end delivers laser radiation through the balloon to tissue to be treated. The method comprises the steps of etching the distal end of the optical fiber to form an etched portion thereof, cladding the etched portion with a medium which secures the optical fiber to the central channel, and microballoons which diffuse the laser radiation radially from the optical fiber, thereby substantially avoiding axial propagation and heating of blood forward of the optical fiber."

U.S. Pat. No. 5,337,381 for a fiber optic cylindrical diffuser, by Biswas et al, patented Aug. 9, 1994, provides the following description: "A fiber optic, cylindrical, light diffuser for medical use includes an unclad distal fiber end where the exposed core end has a conical shape. The core end is enclosed by a sleeve which contacts the clad portion of the fiber only and defines a closed chamber with the distal end of the fiber. The chamber is filled with light diffusing material. The diffuser exhibits highly uniform output light distribution and is capable of carrying relatively high power densities safely."

U.S. Pat. No. 5,207,669 for an optical fiber diffusion tip for uniform illumination, by Baker et al, patented May 4, 1993, provides the following description: "A diffusion tip coupled to the end of an optical fiber for directing laser energy outwardly in a cylindrical or other desired radiation pattern. The diffusion tip includes a core, a cladding around the core and a jacket around the cladding. The cladding has an index of refraction that is lower than that of the core and has a thickness selected to transmit a portion of the laser radiation that is carried through the optical fiber so that laser radiation penetrates through the cladding and the jacket over the length of the diffusion tip. The thickness of the cladding is about the same as or slightly less than the penetration depth of the evanescent field in the cladding. The cladding can be tapered along the length of the diffusion tip to provide a uniform radiation pattern. The diffusion tip is particularly useful in a laser balloon catheter utilized in coronary angioplasty."

U.S. Pat. No. 5,151,096 for a laser catheter diffuser, by Adib I. Khoury, patented Sep. 29, 1992, provides the following description: "A light transmitting and diffusing apparatus is disclosed for activating photodynamic therapy in soft cancerous tumors. In the preferred embodiment, the apparatus is affixed to a standard medical laser that transmits light through an optical fiber to a point adjacent to or within a cancerous tumor. The apparatus includes an unclad fiber-optic core with a reflective cap at a terminal end of the core. A diffuser matrix coats the unclad fiber-optic core and a transparent tubular sleeve encases the matrix and core. The transparent tubular sleeve includes a conical tip adjacent to the terminal end of the core for easy penetration of the cancerous tumors. In use, light leaves the medical laser, travels along the optical fiber into the unclad fiber-optic core. There, some light passes directly out of the core through the diffuser matrix, and the remaining light is reflected, by this reflective cap, back into and around the core, away from its terminal end. The resulting pattern of diffuse light is roughly shaped like a 'butternut-squash,' producing a decreased risk of damage to blood vessels, nerves, etc., that may be just beyond the terminal end of the core, along its longitudinal axis."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a system for diffusing light from an optical fiber wherein the optical fiber is coupled to a light source. The system comprises forming a polymer element adapted to be connected to the optical fiber and incorporating a scattering element with the polymer element wherein the scattering element diffuses the light from the polymer element. The apparatus of the present invention comprises a polymer element operatively connected to the optical fiber and a scattering element operatively connected with the shape polymer element that diffuses the light from the polymer element.

In one embodiment the polymer element comprises a solid polymer body. In another embodiment the polymer element comprises a porous foam polymer body. Another embodiment comprises a solid polymer inner core surrounded by a porous foam polymer. In another embodiment the polymer element comprises shape memory polymer. In yet another embodiment the polymer element comprises a shape memory polymer which can be actuated by heat to transform from a secondary shape to a primary shape.

One embodiment includes a socket-epoxy joint connecting the polymer element to the optical fiber. In another embodiment the polymer element is molded around the optical fiber. In one embodiment the polymer element comprises a cylindrical polymer element. In another embodiment the polymer element comprises a spherical polymer element. In yet another embodiment the polymer element comprises a polymer coating over the exposed core of the optical fiber.

In one embodiment the scattering element causes uniform 360° light emission radially outward over the surface of the polymer element. In another embodiment the scattering element causes a non-uniform pattern of light emission. In one embodiment the scattering element comprises a roughened surface of the polymer element. In another embodiment the scattering element comprises light scattering particles. In yet another embodiment the polymer element comprises a polymer system of at least two phases wherein the scattering element comprises the second phase.

The present invention may be used in various applications in which it is necessary to deliver light radially from the end of an optical fiber or light guide. One potential use is for in situ photoactivation of photosensitive drugs in photodynamic therapy (e.g., to destroy tumors in various locations in the body or inhibit intra-arterial restenosis following balloon angioplasty). Another possible use is for photothermal actuation of shape memory polymer (SMP) devices or actuators, including SMP devices for removing vascular occlusions and treating aneurysms.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

FIGS. 7A and 7B are illustrations of systems for light emittance patterns for an optical fiber or light guide such that it diffuses light radially outward when coupled to a light source.

FIGS. 9A and 9B show one embodiment of the SMP LDE that may actuate from a straight rod shape to a full loop.

FIGS. 10A and 10B show another embodiment of the SMP LDE.

DETAILED DESCRIPTION OF THE INVENTION

Figure 1:
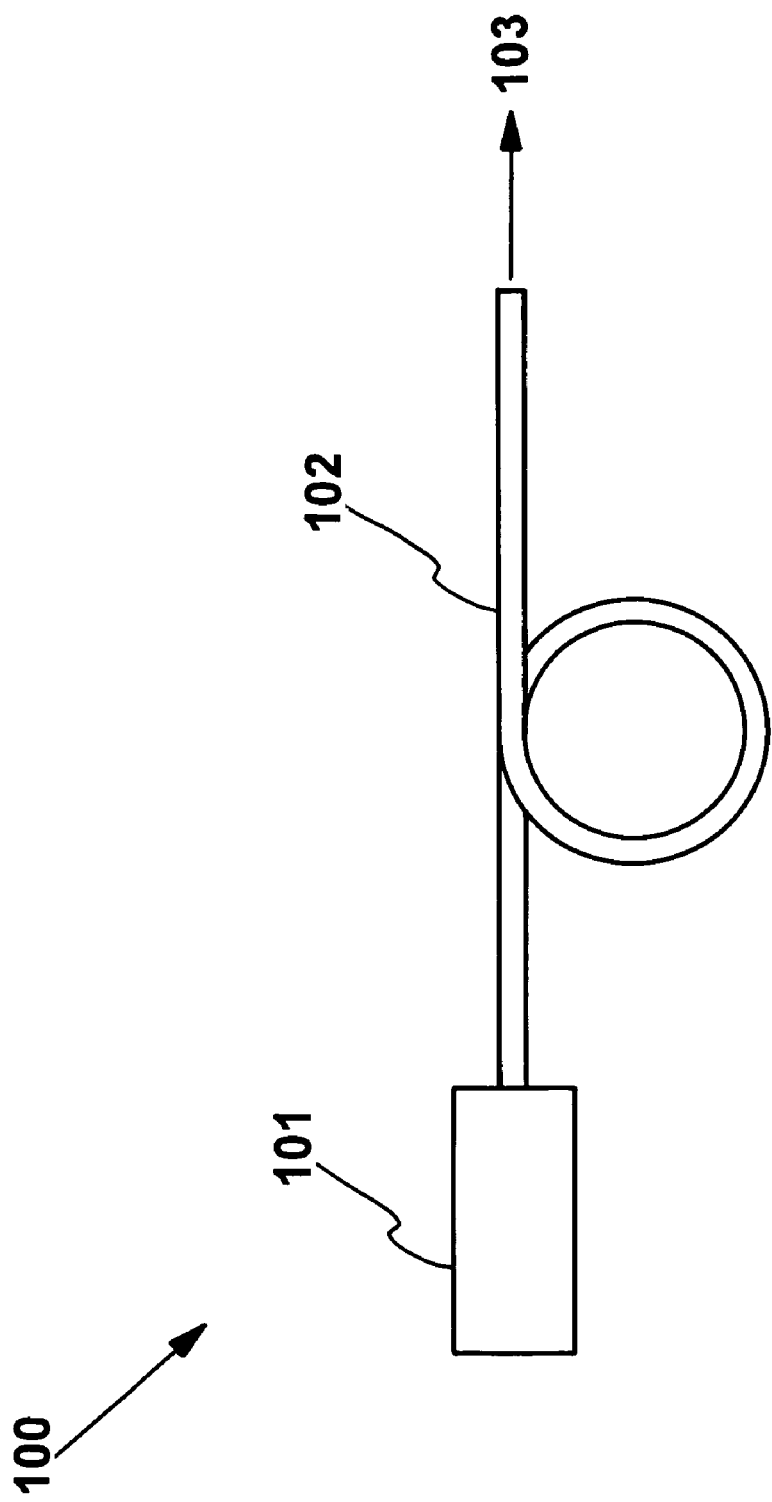
FIG. 1 is an illustration of a system used to guide light from a light source to a target area away from the source.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

The present invention provides a light diffusing element comprising a polymer body of arbitrary shape that is adapted to be connected to a an optical fiber or light guide wherein the optical fiber or light guide is coupled to a light source for producing light with light energy. The terms optical fiber and light guide are used interchangeably in the specification and claims. In one embodiment a light diffusing apparatus diffuses light from an optical fiber or a light guide that includes a polymer body operatively connected to the optical fiber or light guide and diffusing element incorporated with the polymer body that diffuses the light radially outward from the polymer body.

One incarnation of the invention is comprised of a light diffusing element (LDE) of arbitrary shape which is coupled to the end of an optical fiber or light guide. The LDE may be comprised of a variety of light-transmitting polymer-based materials. In particular, the LDE may be comprised of shape memory polymer (SMP). Either thermoplastic or thermoset SMP types may be used. SMP has the ability to maintain a secondary or stressed shape until it is heated to a specific temperature (i.e., glass transition temperature, $T_g$), causing it to resume its primary or equilibrium shape. In addition, the stiffness of the SMP at a given temperature can be tailored by adjusting its $T_g$. For example, SMP with a $T_g$ of 45° C. will be more flexible at body temperature (37° C.) than SMP with a $T_g$ of 75° C. Furthermore, SMP can be made to transmit light. These properties of SMP provide a unique platform for creating a light diffusing, variably flexible, deformable extension of an optical fiber. An infinite number of LDE shapes and light diffusing patterns are possible depending on the application. The most straightforward embodiment is a cylindrical element that diffuses light over its entire length and circumference (360°).

Another incarnation of the invention is comprised of modification of the surface of an optical fiber to create a light diffusing region on the fiber. Any outer protective buffer layers are first removed to expose the cladding of the optical fiber. The cladding may then be either completely removed or roughly abraded by bead blasting, chemical etching, or laser etching, to fully or partially expose the fiber core. A light diffusing coating layer is then applied to the fiber surface. One method of light diffusion comprises a coating layer that is comprised of at least two phases. First, it would contain a matrix (continuous) phase with refractive index equal to (or slightly greater than) that of the optical fiber core. The second phase would be dispersed within the first phase and would be of a material with a substantially different refractive index than the matrix. This second phase may have any of the following characteristics:

- Be a particulate material with a size such that it scatters light predominantly at a 90 degree angle. Specific examples of particulates that might be suitable include single core emulsion polymers, core-shell emulsion polymers, hollow core emulsion polymers, and mineral particles (e.g., calcium carbonate, alumina).
- Can have a spherical or non-spherical shape (aspect ratio>1).
- Is loaded at volume fractions in the range 0 to 10%.
- The dispersed phase may result from phase separation in a polymer system which can be applied as a single phase; then phase separates during polymerization, cure, loss of solvent, exposure to nonsolvent, or change in temperature. The polymer system may be a physical blend or copolymer.

The present invention may be used in various applications in which it is necessary to deliver light radially from the end of an optical fiber or light guide. One potential use is for in situ photoactivation of photosensitive drugs in photodynamic therapy (e.g., to destroy tumors in various locations in the body or inhibit intra-arterial restenosis following balloon angioplasty). Another possible use is for photothermal actuation of shape memory polymer (SMP) devices and actuators, including SMP devices for removing vascular occlusions or treating aneurysms.

Shape memory polymers (SMPs) have the useful ability of being formable into a primary shape, being reformable into a stable secondary shape, and then being controllably actuated to recover their primary shape. The primary shape is obtained after processing and fixed by physical structures or chemical crosslinking. The secondary shape is obtained by deforming the material while in an elastomeric state and that shape is fixed in one of several ways including cooling the polymer below a crystalline, liquid crystalline, or glass transition temperature; by inducing additional covalent or ionic crosslinking, etc. While in the secondary shape some or all of the polymer chains are perturbed from their equilibrium random walk conformation, having a certain degree of bulk orientation. The oriented chains have a certain potential energy, due to their decreased entropy, which provides the driving force for the shape recovery. However, they do not spontaneously recover due to either kinetic effects (if below their lower glass transition temperature) or physical restraints (physical or chemical crosslinks). Actuation then occurs for the recovery to the primary shape by removing that restraint, e.g., heating the polymer above its glass transition or melting temperature, removing ionic or covalent crosslinks, etc. The present invention can be used as part of a photothermal actuation mechanism to achieve shape recovery of an SMP device or actuator. The diffused light can be absorbed by the SMP and converted to heat which causes the temperature of the SMP to reach the glass transition temperature, inducing shape recovery.

Referring now to the drawings and in particular to FIG. 1, an illustration of a system used to guide light from a light source to a target area away from the source is shown. The system in general is designated by the reference numeral 100. The system 100 comprises a light source 101, a light guide 102, and a target area 103.

The system 100 is an optical fiber 102 used to guide light from a light source 101 such as a laser, lamp, light-emitting diode, etc., to a target area 103 away from the source 101. In general, the light generated from the light source 101 is emitted from the distal end of the optical fiber into a cone of light propagating axially. This is pertinent when the light needs to be delivered to a target that lies along the fiber axis. In some applications, however, it is desirable to deliver light to a target that circumferentially surrounds the optical fiber 102. In such a scenario, a system of directing the light generated by the light source radially outward from the fiber 102 is necessary.

Figure 2:
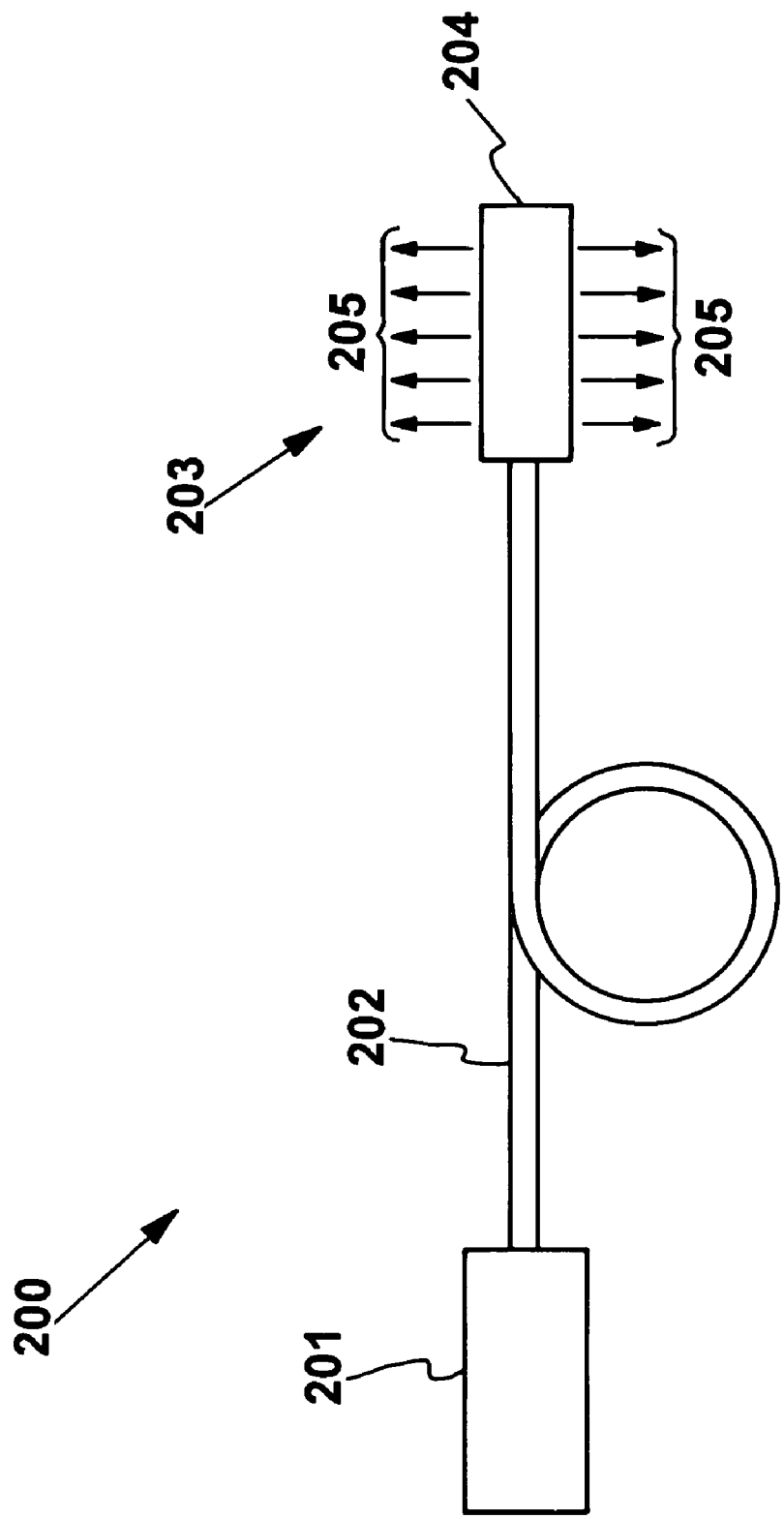
FIG. 2 is an illustration a system used to guide light from a light source to a target area away from the source that diffuses the light radially.

Referring now to FIG. 2, an illustration of a system used to guide light from a light source to a target area away from the source that diffuses the light radially is shown. The system in general is designated by the reference numeral 200. The system 200 is an optical fiber 202 used to guide light from a light source 201 such as a laser, lamp, light-emitting diode, etc., to a target area 203 away from the source 201. In some applications it is desirable to deliver light to a target that circumferentially surrounds the optical fiber 202. In this scenario, a system of directing the light generated by the light source radially outward from the fiber 202 is necessary.

The present invention provides systems for augmenting a standard optical fiber or light guide 202 such that it diffuses light radially outward as illustrated by arrows 205. The system 200 comprises a light source 201, a light guide 202, a target area 203, and a system 204 of directing the light generated by the light source 201 radially outward from the fiber 202 as illustrated by arrows 205.

Figures 3A, 3B:
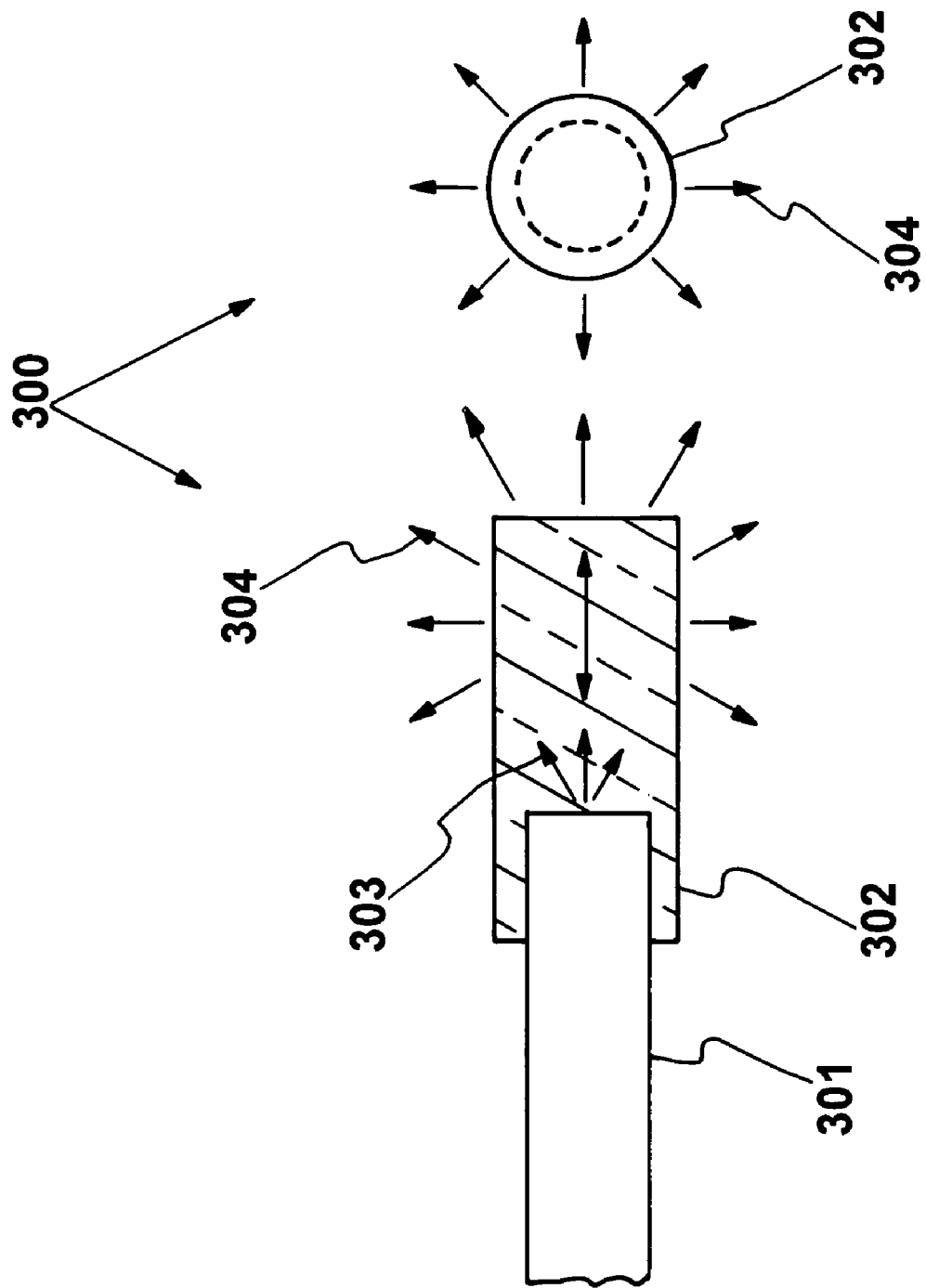
FIGS. 3A and 3B are illustrations of systems for augmenting a standard optical fiber or light guide such that it diffuses light radially outward when coupled to a light source.

Referring now to FIGS. 3A and 3B, illustrations of a system for augmenting a standard optical fiber or light guide such that it diffuses light radially outward when coupled to a light source are shown. The system is designated generally by the reference numeral 300. The system 300 comprises an optical fiber 301 and a 360° light diffusing element 302. The light is emitted from the end of the optical fiber 301 as indicated by the arrows 303. The 360° light diffusing element 302 directs the light radially outward as indicated by the arrows 304.

Figure 4:
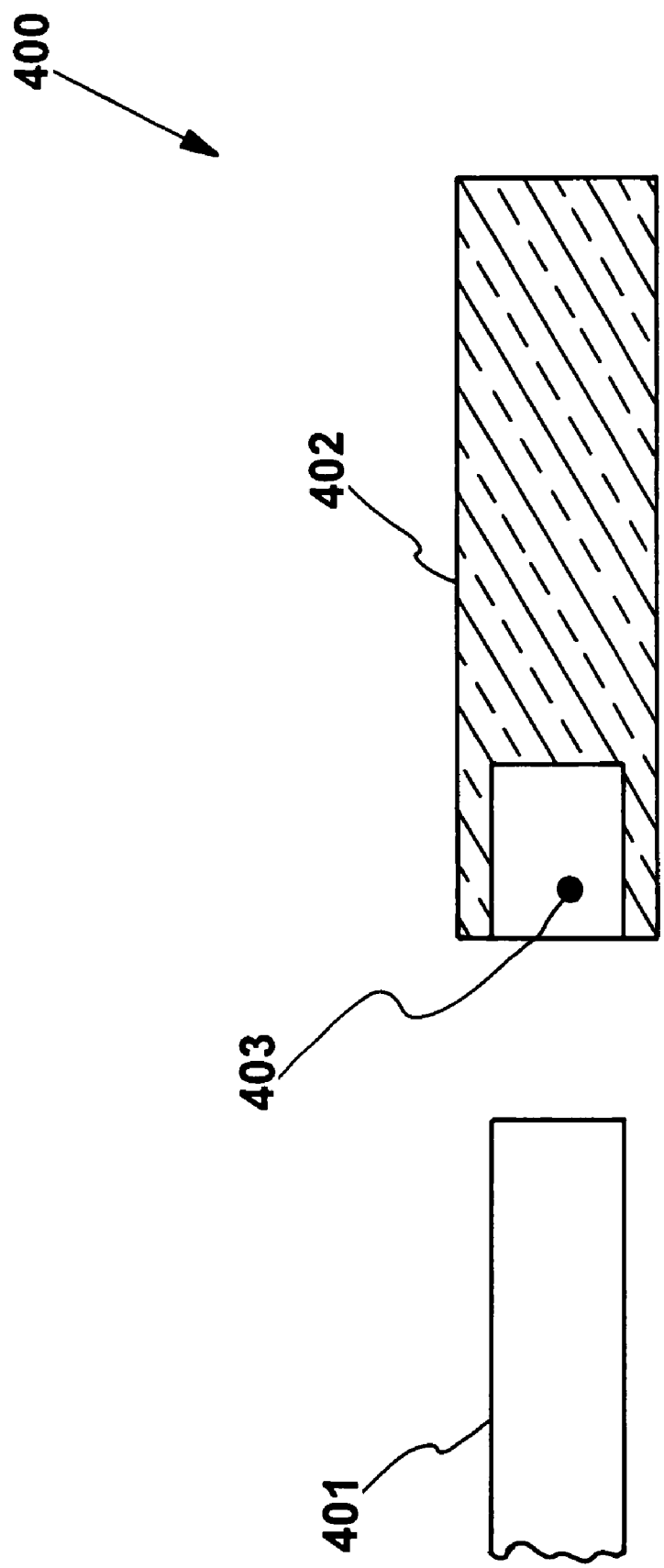
FIG. 4 is an illustration of a system for augmenting a standard optical fiber or light guide such that it diffuses light radially outward when coupled to a light source.

Referring now to FIG. 4, an illustration of a system for augmenting a standard optical fiber or light guide such that it diffuses light radially outward when coupled to a light source is shown. The system is designated generally by the reference numeral 400. The system 400 comprises an optical fiber 401 and a light diffusing element (LDE) 402. The light is emitted from the end of the optical fiber. The light diffusing element (LDE) 402 directs the light radially outward. The LDE may be coupled to the optical fiber by various systems. One coupling method involves creating a socket 403 in the LDE 402 to receive the optical fiber 401 and applying transparent epoxy in the socket to create the bond. The socket 403 may be created by various methods, including mechanical or laser drilling, or by casting (e.g., injection molding) the LDE material in a mold configured to impart a socket. The epoxy should possess an index of refraction between that of the LDE material and the optical fiber to reduce back reflection of the light at the interface.

Figure 5:
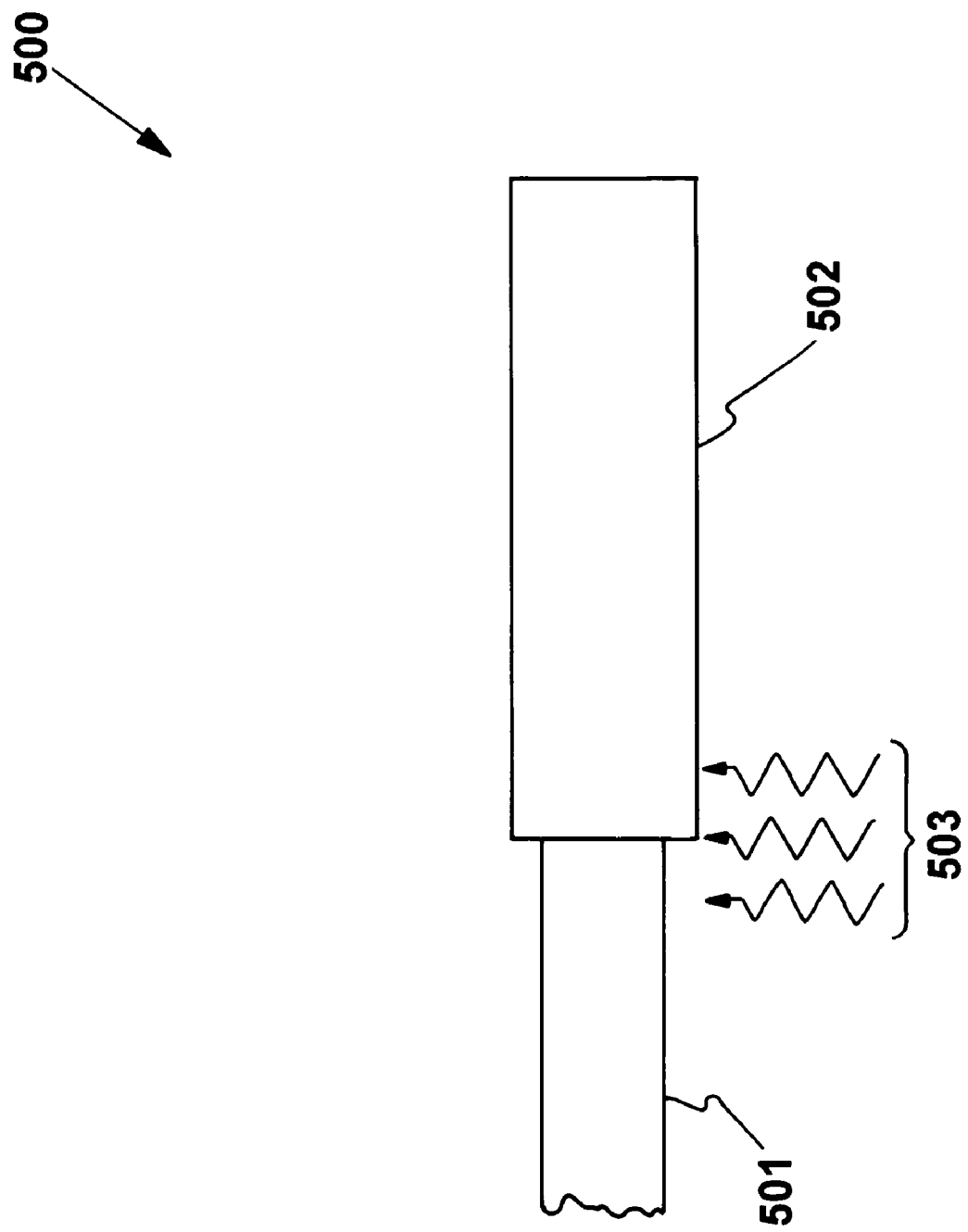
FIG. 5 is an illustration of another system for augmenting a standard optical fiber or light guide such that it diffuses light radially outward when coupled to a light source.

Referring now to FIG. 5, an illustration of another system for augmenting a standard optical fiber or light guide such that it diffuses light radially outward when coupled to a light source is shown. The system is designated generally by the reference numeral 500. The system 500 comprises an optical fiber 501 and a light diffusing element (LDE) 502. The light is emitted from the end of the optical fiber. The light diffusing element (LDE) 502 directs the light radially outward. The LDE may be coupled to the optical fiber by various systems. The coupling method illustrated in FIG. 5 involves pushing the optical fiber 501 into the LDE 502 under heated conditions as illustrated by the arrows 503 and allowing the LDE material to cool in contact with the optical fiber to create the bond. This method does not rely on an external bonding agent such as epoxy.

Figure 6:
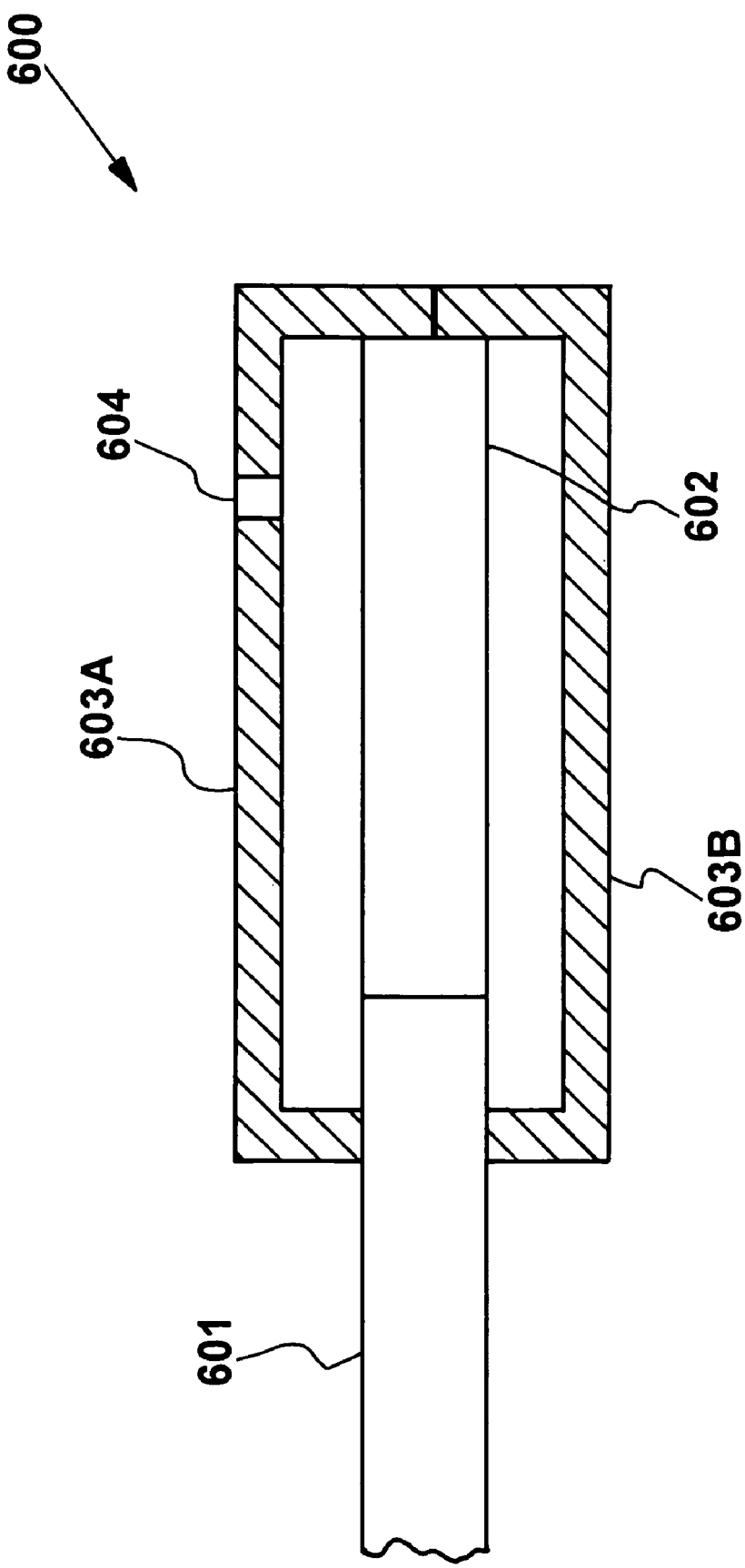
FIG. 6 is an illustration of another system for augmenting a standard optical fiber or light guide such that it diffuses light radially outward when coupled to a light source.

Referring now to FIG. 6, an illustration of another system for augmenting a standard optical fiber or light guide such that it diffuses light radially outward when coupled to a light source is shown. The system is designated generally by the reference numeral 600. The system 600 comprises an optical fiber 601 and a light diffusing element (LDE) 602. The light is emitted from the end of the optical fiber. The light diffusing element (LDE) 602 directs the light radially outward.

The LDE 602 may be coupled to the optical fiber by various systems. The coupling method illustrated in FIG. 6 involves casting uncured LDE material around the optical fiber using a suitable mold 603A and 603B and allowing the material to cure in contact with the optical fiber to create the bond. A port 604 can be incorporated into the mold 603A/603B for injection molding. The optical fiber can be pre-cleaned using UV ozone or a plasma cleaner, acid or base etched, or surface functionalized to both improve adhesion to the LDE and wetting, thereby eliminating bubbles at the interface.

Referring now to FIGS. 7A and 7B, illustrations of systems for light emittance patterns for an optical fiber or light guide such that it diffuses light radially outward when coupled to a light source, are shown. Two light emittance pattern systems are described. The systems shown in FIGS. 7A and 7B are designated generally by the reference numerals 700A and 700B. The systems 700A and 700B comprise an optical fiber 701 and a light diffusing element (LDE) 702. The light is emitted from the end of the optical fiber 701. The light diffusing element 702 directs the light radially outward. Light blocking layer 703 provides a single side-firing LDE 702 shown in FIG. 7A. Light blocking layer 704A and 704B provide dual side-firing shown in FIG. 7B.

Various methods are available to make the LDE 702 light diffusing. One method involves creating a rough surface on the LDE 702. The rough surface can be created by various means, including bead blasting, laser etching, chemical etching, or otherwise abrading the surface of the LDE 702. Alternatively, the uncured LDE material may be cast in a mold whose surface has been roughened by such means to impart roughness to the LDE surface. Specific light distribution patterns or areas of light diffusion may be created by masking regions of the LDE (or mold) prior to surface roughening or, in the case of laser etching, by directing the laser beam to specific areas on the surface. In addition, the amount of light diffusion may be adjusted by varying the degree of surface roughening to vary the density of scattering sites (i.e., more roughening causes more light to diffuse outward).

For the case of a simple cylindrical LDE, the degree of surface roughening may increase along the length of the element to compensate for the light lost to diffusion, resulting in axially uniform light distribution. Another method involves doping the LDE material with light scattering particles to generate radial light emission. The scattering particles may be doped into the bulk material or added to a coating layer with refractive index equal to (or slightly greater than) that of the bulk material. The scattering particles have a refractive index that is substantially different from that of the LDE or coating material and should be of size to predominantly scatter light at a 90° angle. Possible particles include single core emulsion polymers, core-shell emulsion polymers, hollow core emulsion polymers, and mineral particles. Areas of the LDE surface may be made opaque or reflective to limit light emission to a preferred direction (or multiple directions).

As shown in FIGS. 7A and 7B, various light emittance patterns, including (but not limited to) single side-firing FIG. 7A and dual side-firing FIG. 7B, are possible. This can be achieved by masking the areas where light is to be emitted prior to coating the LDE 702 with an opaque or reflective material, and then removing the masking to leave a light blocking or reflective layer in the desired area(s). Alternatively, liquid crystalline core particles dispersed in a coating layer can be used to control the light emittance by controlling the orientation of the liquid crystals to either transmit or block light. A combination of surface roughness and light scattering particles may also be used to promote radial light diffusion.

Figure 8A:
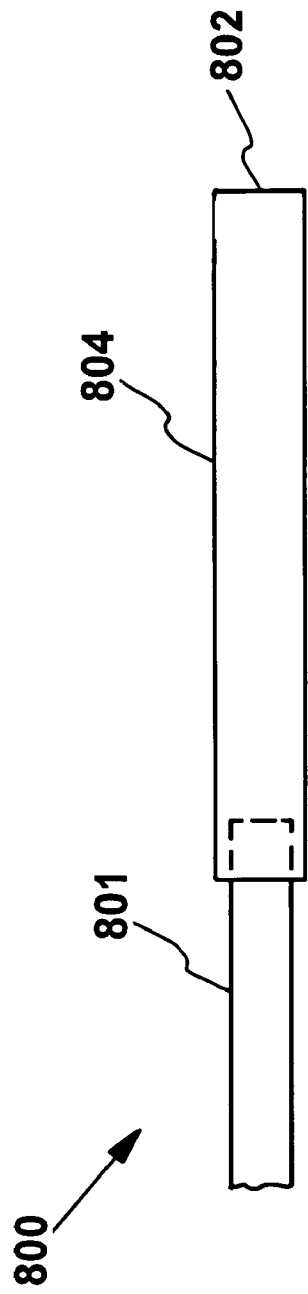
FIGS. 8A and 8B show a light diffusing element (LDE) made from shape memory polymer (SMP), light absorbing dyes or other particles can be embedded in or coated onto the SMP LDE to achieve photothermal actuation (i.e., transformation of the SMP LDE from a stable secondary shape to a different "memorized" primary shape by heating to the glass transition temperature $T_g$).
Figure 8B:
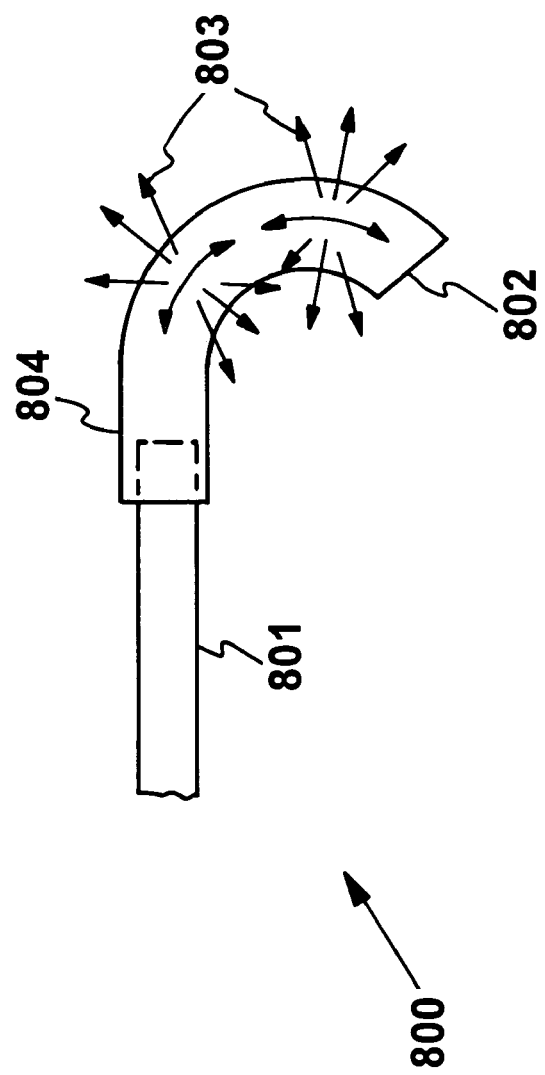

Referring now to FIGS. 8A and 8B, for the case of an LDE made from SMP, light absorbing dyes or other particles can be embedded in or coated onto the LDE to achieve photothermal actuation (i.e., transformation of the SMP LDE from a stable secondary shape to a different "memorized" primary shape by heating to $T_g$). The system shown in FIG. 8 is designated generally by the reference numeral 800. The system 800 comprises an optical fiber 801 and a light diffusing element (LDE) 802. The light is emitted from the end of the optical fiber 801.

In the case where the dye or particles are coated onto the LDE 802, the dye or particles are dispersed into a material (SMP or other polymer) with refractive index equal to (or slightly greater than) the SMP which is then coated onto the SMP LDE surface. In one embodiment, the LDE 802 may actuate from a straight rod shape (FIG. 8A) to a curved rod shape, illustrated in FIG. 8B. As the LDE 802 changes shape, the direction of emitted light represented by arrows 803 will also change depending on the geometry of the shape transformation. Absorbers will be chosen to permit temperature elevation in the vicinity of the $T_g$ of the SMP; the temperature rise is governed by the absorbance of the dye/particles at the wavelength of the light and the concentration of the dye/particles in the SMP. The absorbers may be uniformly or non-uniformly distributed to achieve the desired temperature profile. In addition, the absorbers may be locally confined to achieve a distinct region 804 (or multiple regions) of temperature elevation corresponding to the area (or areas) of the SMP LDE where photothermal actuation is desired.

In addition to photothermally actuating the SMP LDE in which case the $T_g$ is higher than the temperature of the surrounding environment, the $T_g$ of the material may be chosen to be approximately equal to the environmental temperature such that spontaneous actuation occurs when the SMP LDE is introduced into the environment. In this case, light from the light source is not needed to achieve actuation.

Referring now to FIGS. 9A and 9B, in one embodiment the SMP LDE may actuate from a straight rod shape to a full loop. The system shown in FIG. 9 is designated generally by the reference numeral 900. The system 900 comprises an optical fiber 901 and a light diffusing element (LED) 902. The light is emitted from the end of the optical fiber 901.

Various shapes of the SMP LDE are possible, each directing the light in a unique way depending on the LDE geometry. For the case of an LDE made from SMP, light absorbing dyes or other particles can be embedded in or coated onto the LDE to achieve photothermal actuation (i.e., transformation of the SMP LDE from a stable secondary shape to a different "memorized" primary shape by heating to $T_g$). In the case where the dye or particles are coated onto the LDE 902, the dye or particles are dispersed into a material (SMP or other polymer) with refractive index equal to (or slightly greater than) the SMP which is then coated onto the SMP LDE surface. In one embodiment, the LDE 902 may actuate from a straight rod shape (FIG. 9A) to a full loop shape, illustrated in FIG. 9B.

Referring now to FIGS. 10A and 10B, another embodiment of the SMP LDE is shown. The system shown in FIG. 10 is designated generally by the reference numeral 1000. The system 1000 comprises an optical fiber 1001 and a light diffusing element (LDE) 1002. The light is emitted from the end of the optical fiber 1001.

Various shapes of the SMP LDE are possible, each directing the light in a unique way depending on the LDE geometry. For the case of an LDE made from SMP, light absorbing dyes or other particles can be embedded in or coated onto the LDE to achieve photothermal actuation (i.e., transformation of the SMP LDE from a stable secondary shape to a different "memorized" primary shape by heating to $T_g$). In the case where the dye or particles are coated onto the LDE 1002, the dye or particles are dispersed into a material (SMP or other polymer) with refractive index equal to (or slightly greater than) the SMP which is then coated onto the SMP surface. In one embodiment, the LDE 1002 may actuate from a straight rod shape (FIG. 10A) to an open "grappling hook" shape illustrated in FIG. 10B. The LDE 1002 includes segments 1003 that form the "grappling hook." In operation, the LDE 1002 actuates from a straight rod shape to an open "grappling hook" shape as illustrated in FIG. 10B.

Figure 11:
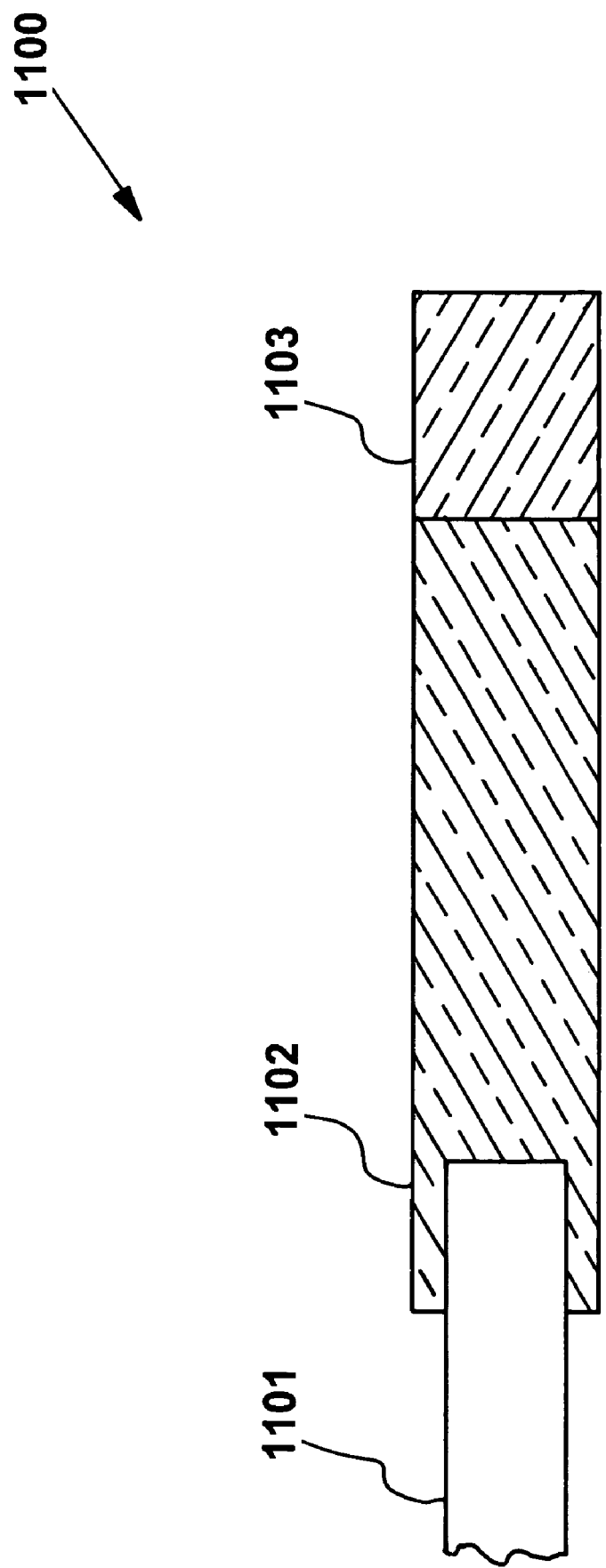
FIG. 11 shows another SMP LED with sections with different $T_g$'s that may be cascaded together to form an LDE of variable axial stiffness.

Referring now to FIG. 11, another SMP LDE with sections with different $T_g$'s may be cascaded together to form an LDE of variable axial stiffness. The system is designated generally by the reference numeral 1100. The system 1100 comprises an optical fiber 1101 and two light diffusing elements 1102 and 1103.

The light is emitted from the end of the optical fiber 1101. The sections 1102 and 1103 with different $T_g$'s are cascaded together to form an LDE of variable axial stiffness. This is accomplished by casting successive sections of uncured SMP in a mold or by bonding the sections together using transparent epoxy or by direct pressure under heat. In one embodiment, the LDE consists of a relatively stiff section 1102 of high $T_g$ SMP proximally and a more flexible section 1103 of low $T_g$ SMP distally.

The LDE 1102/1103 may be comprised of SMP foam of arbitrary shape in full or in part. The SMP foam inherently diffuses light outward without further modification of its surface. A unique feature of the SMP foam is that it may be compressed into a stable secondary collapsed shape and actuated by controlled heating into its primary expanded shape. This feature enables it to fill volumes of arbitrary shapes upon actuation which, for example, facilitates centering of the LDE in a particular area to achieve uniform light distribution to the surrounding target. As with standard SMP, the SMP foam may be doped with light absorbers for photothermal actuation, or may spontaneously actuate upon introduction into a given environment. Also, one or more areas of the SMP foam surface may be coated with a reflective or opaque layer to control the light emittance.

Figure 12A:
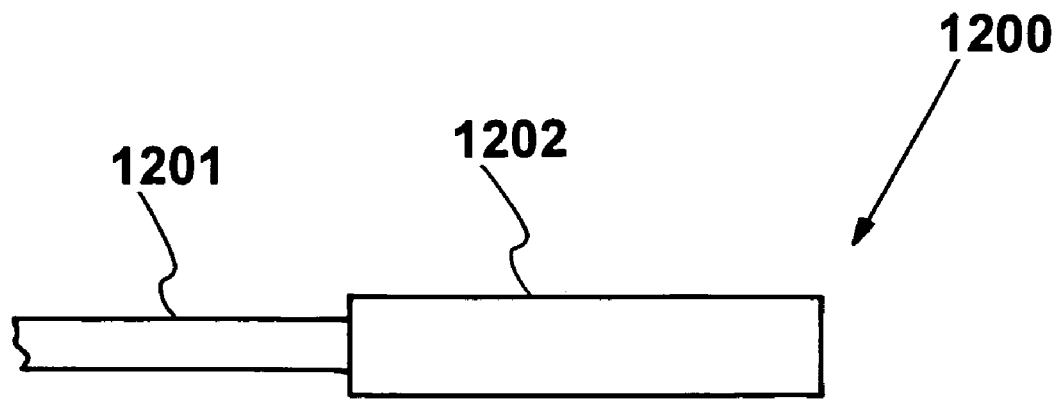
FIGS. 12A and 12B show a system comprised of SMP foam and directly coupled to an optical fiber.
Figure 12B:
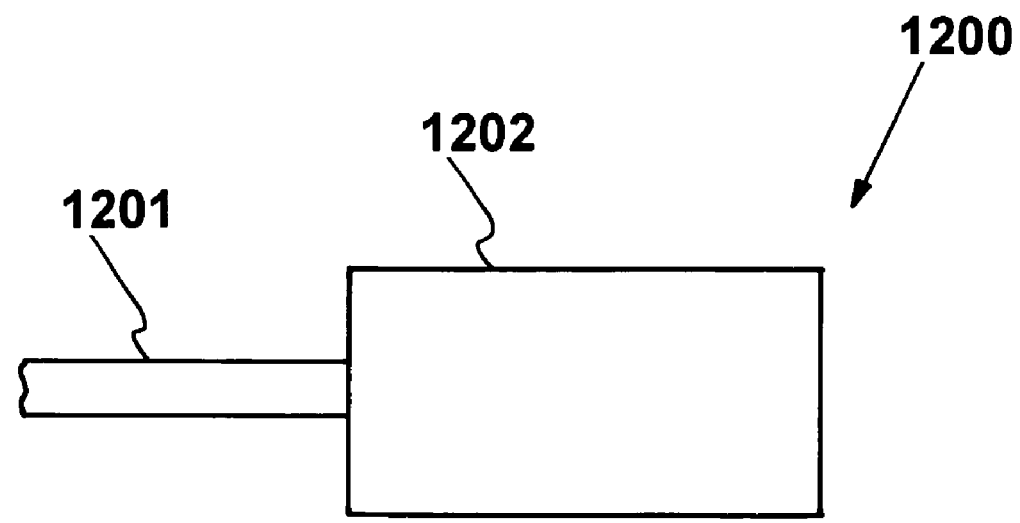

Referring now to FIGS. 12A and 12B, a system comprised of SMP foam and directly coupled to an optical fiber is shown. The system shown in FIG. 12 is designated generally by the reference numeral 1200. The system 1200 comprises an optical fiber 1201 and a light diffusing element (LDE) 1202. The light is emitted from the end of the optical fiber 1201.

The LDE 1202 is comprised of SMP foam of arbitrary shape in full or in part. The SMP foam inherently diffuses light outward without further modification of its surface. A unique feature of the SMP foam is that it may be compressed into a stable secondary collapsed shape and actuated by controlled heating into its primary expanded shape. This feature enables it to fill volumes of arbitrary shapes upon actuation which, for example, facilitates centering of the LDE in a particular area to achieve uniform light distribution to the surrounding target. As with standard SMP, the SMP foam may be doped with light absorbers for photothermal actuation, or may spontaneously actuate upon introduction into a given environment. Also, one or more areas of the SMP foam surface may be coated with a reflective or opaque layer to control the light emittance.

Referring again to FIG. 12, the LDE 1202 is comprised entirely of SMP foam and directly coupled to the optical fiber 1201. The SMP foam expands to a cylindrical shape, as illustrated in FIG. 12B.

Figure 13A:
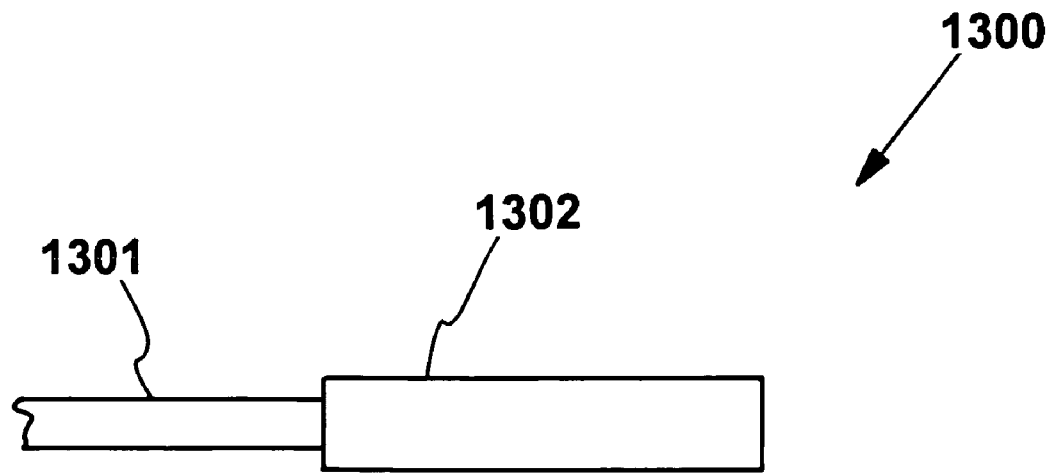
FIGS. 13A and 13B show a system comprised of SMP foam and directly coupled to an optical fiber.
Figure 13B:
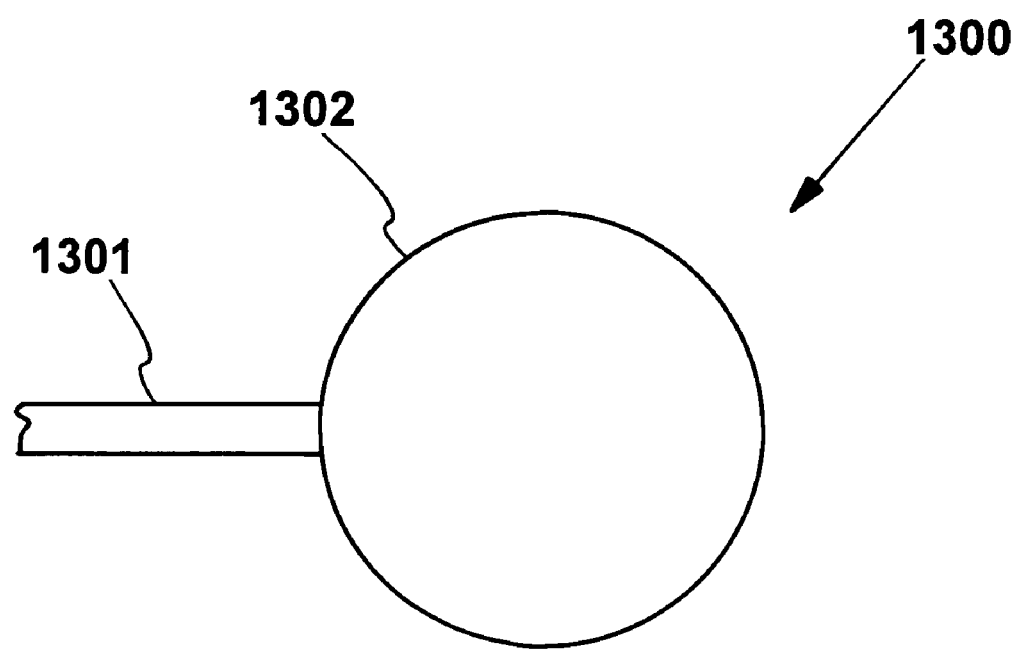

Referring now to FIGS. 13A and 13B, a system comprised of SMP foam and directly coupled to an optical fiber is shown. The system shown in FIG. 13 is designated generally by the reference numeral 1300. The system 1300 comprises an optical fiber 1301 and a light diffusing element (LDE) 1302. The light is emitted from the end of the optical fiber 1301.

The LDE 1302 is comprised of SMP foam of arbitrary shape in full or in part. The SMP foam inherently diffuses light outward without further modification of its surface. A unique feature of the SMP foam is that it may be compressed into a stable secondary collapsed shape and actuated by controlled heating into its primary expanded shape. This feature enables it to fill volumes of arbitrary shapes upon actuation which, for example, facilitates centering of the LDE in a particular area to achieve uniform light distribution to the surrounding target. As with standard SMP, the SMP foam may be doped with light absorbers for photothermal actuation, or may spontaneously actuate upon introduction into a given environment. Also, one or more areas of the SMP foam surface may be coated with a reflective or opaque layer to control the light emittance.

Referring again to FIG. 13, the LDE 1302 is comprised entirely of SMP foam and directly coupled to the optical fiber 1301. The SMP foam expands to a spherical shape, as illustrated in FIG. 13B.

Figure 14A:
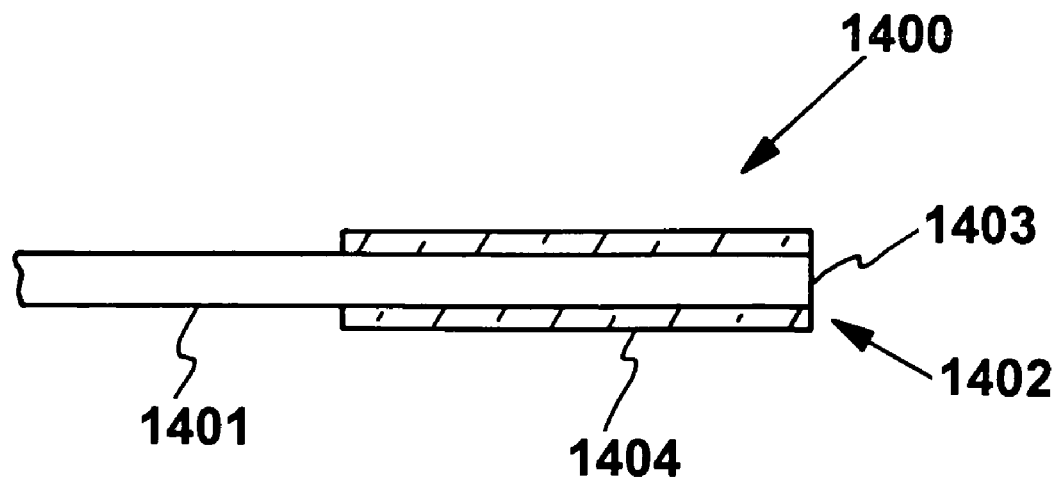
FIGS. 14A and 14B show a system comprised of SMP foam surrounding a solid SMP LDE coupled to an optical fiber.
Figure 14B:
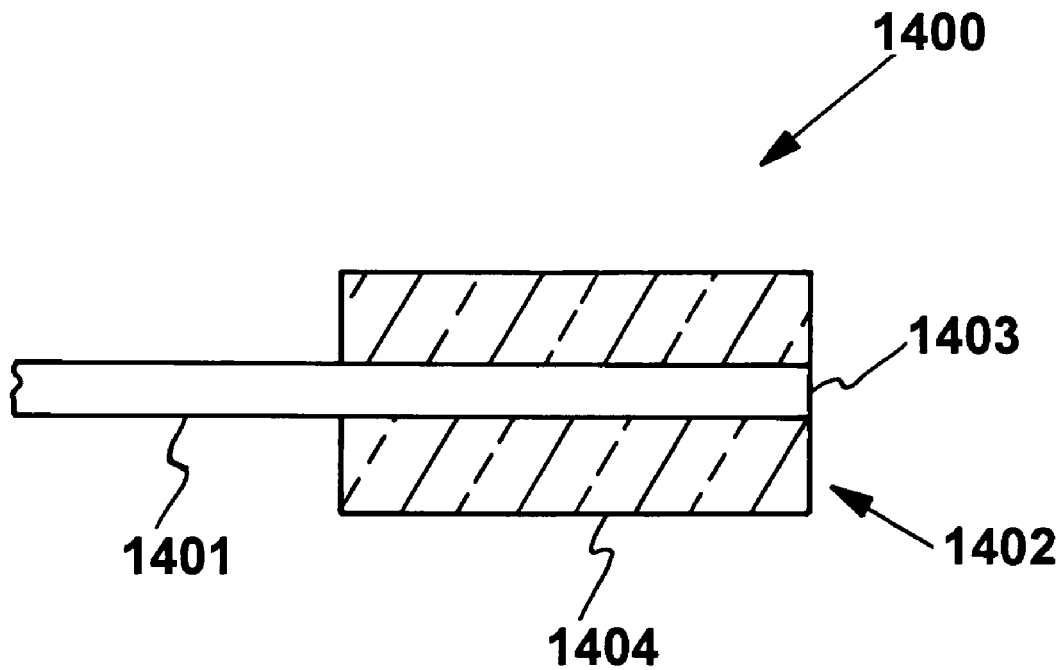

Referring now to FIGS. 14A and 14B, a system comprised of SMP foam surrounding a solid SMP LDE coupled to an optical fiber is shown. The system shown in FIG. 14 is designated generally by the reference numeral 1400. The system 1400 comprises an optical fiber 1401 and a light diffusing element (LDE) 1402. The light is emitted from the end of the optical fiber 1401.

The LDE 1402 is comprised of SMP foam of arbitrary shape in full or in part. The SMP foam inherently diffuses light outward without further modification of its surface. A unique feature of the SMP foam is that it may be compressed into a stable secondary collapsed shape and actuated by controlled heating into its primary expanded shape. This feature enables it to fill volumes of arbitrary shapes upon actuation which, for example, facilitates centering of the LDE in a particular area to achieve uniform light distribution to the surrounding target. As with standard SMP, the SMP foam may be doped with light absorbers for photothermal actuation, or may spontaneously actuate upon introduction into a given environment. Also, one or more areas of the SMP foam surface may be coated with a reflective or opaque layer to control the light emittance.

Referring again to FIG. 14, the LDE 1402 is comprised of SMP foam surrounding a solid SMP LDE coupled to the optical fiber 1401. The LDE 1402 is comprised of an inner SMP LDE 1403 surrounded by an outer SMP foam light diffusing layer 1404. The SMP foam expands to a cylindrical shape, as illustrated in FIG. 14B.

Figure 15:
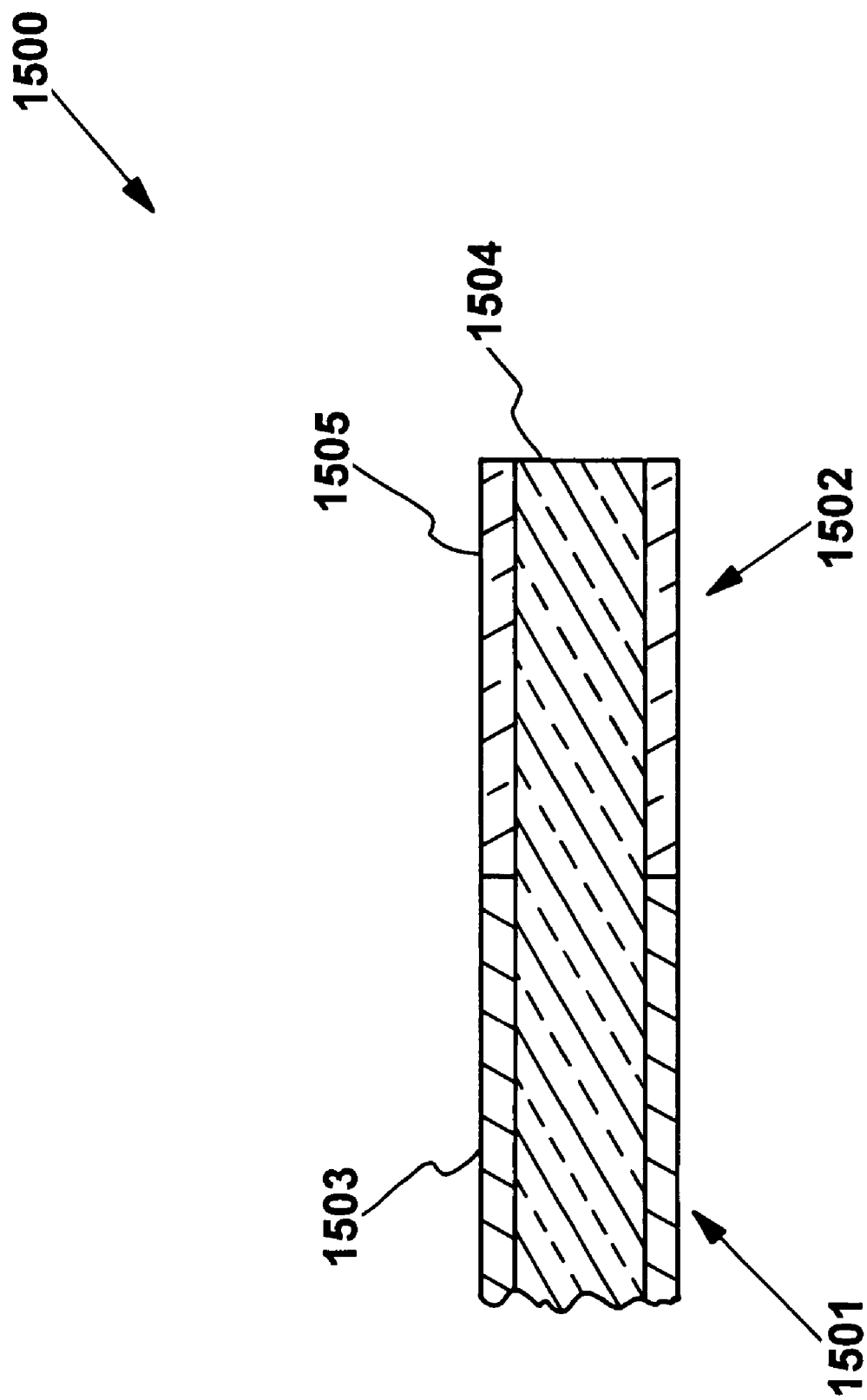
FIG. 15 shows an illustration of a system for augmenting a standard optical fiber or light guide such that it diffuses light radially outward when coupled to a light source.

Referring now to FIG. 15, an illustration of a system for augmenting a standard optical fiber or light guide such that it diffuses light radially outward when coupled to a light source is shown. The system is designated generally by the reference numeral 1500. The system 1500 utilizes an optical fiber 1501.

The system 1500 is another incarnation of the invention comprised of modification of the surface of the optical fiber 1501 to create a light diffusing region 1502 on the fiber. The optical fiber 1501 has an outer protective buffer layer 1503. The outer protective buffer layer 1503 is first removed in the light diffusing region 1502 to expose the cladding 1504 of the optical fiber 1501. The cladding may then be either completely removed or roughly abraded by bead blasting, chemical etching, or laser etching, to fully or partially expose the fiber core. Referring again to FIG. 15, a light diffusing coating layer 1505 is then applied to the fiber surface.

One method of light diffusion comprises a coating layer 1505 that is comprised of at least two phases. First, it would contain a matrix (continuous) phase with refractive index equal to (or slightly greater than) that of the optical fiber core. The second phase would be dispersed within the first phase and would be of a material with a substantially different refractive index than the matrix. This second phase may have any of the following characteristics:

Be a particulate material with a size such that it scatters light predominantly at a 90 degree angle. Specific examples of particulates that might be suitable include single core emulsion polymers, core-shell emulsion polymers, hollow core emulsion polymers, and mineral particles (e.g., calcium carbonate, alumina).

Can have a spherical or non-spherical shape (aspect ratio>1).

Is loaded at volume fractions in the range 0 to 10%.

The dispersed phase may result from phase separation in a polymer system which can be applied as a single phase; then phase separates during polymerization, cure, loss of solvent, exposure to nonsolvent, or change in temperature. The polymer system may be a physical blend or copolymer.

Another method of light diffusion comprises roughening the surface of the coating layer 1505. A combination of a light scattering phase in the coating and roughening the coating surface may also be used to promote light diffusion.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An apparatus that guides light from a light source to a target area away from the light source, comprising:
   an optical fiber, said optical fiber having a light transmitting core, a cladding layer about the core, a proximal end, and a distal end, the proximal end of the optical fiber being coupled to the light source,
   a light transmitting polymer element that is operatively connected to the distal end of the optical fiber, said light transmitting polymer element comprised of a shape memory polymer, and
   wherein said light transmitting polymer element is comprised of a light diffusing element incorporated with said light transmitting polymer element to diffuse light radially outward from said light transmitting polymer element.

2. The apparatus that guides light from a light source to a target areaway from the light source of claim 1 wherein said polymer element comprises a solid polymer body.

3. The apparatus that guides light from a light source to a target areaway from the light source of claim 1 wherein said polymer element comprises a porous foam polymer body and wherein said scattering element comprises the inherent porous structure of said porous foam polymer body.

4. The apparatus that guides light from a light source to a target areaway from the light source of claim 1 wherein said polymer element comprises a solid polymer body and a porous foam polymer body about the solid polymer body.

5. The apparatus that guides light from a light source to a target areaway from the light source of claim 1 wherein said polymer element comprises a polymer coating over the exposed core at the distal end of the optical fiber, said cladding layer being removed to expose said core, said polymer coating having a refractive index equal to or slightly greater than that of the exposed core.

6. The apparatus that guides light from a light source to a target areaway from the light source of claim 1 wherein said polymer element comprises a solid shape memory polymer.

7. The apparatus that guides light from a light source to a target areaway from the light source of claim 1 wherein said polymer element comprises a porous foam shape memory polymer and wherein said scattering element comprises the inherent porous structure of said porous foam shape memory polymer body.

8. The apparatus that guides light from a light source to a target areaway from the light source of claim 1 wherein said polymer element comprises a solid shape memory polymer body and a porous foam shape memory polymer body about the solid shape memory polymer body.

9. The apparatus that guides light from a light source to a target areaway from the light source of claim 1 wherein said polymer element comprises a cylindrical polymer body.

10. The apparatus that guides light from a light source to a target areaway from the light source of claim 1 wherein said polymer element comprises a spherical polymer body.

11. The apparatus that guides light from a light source to a target areaway from the light source of claim 1 wherein said polymer element comprises two or more polymer sections cascaded together, said polymer sections having different glass transition temperatures to provide variable axial stiffness along the length of said polymer element.

12. The apparatus that guides light from a light source to a target areaway from the light source of claim 1 including a socket-epoxy joint connecting said polymer element to the optical fiber.

13. The apparatus that guides light from a light source to a target areaway from the light source of claim 1 wherein said polymer element is molded around the optical fiber.

14. The apparatus that guides light from a light source to a target areaway from the light source of claim 1 wherein said scattering element causes uniform 360° light emission radially outward over the surface of said polymer element.

15. The apparatus that guides light from a light source to a target areaway from the light source of claim 1 wherein said scattering element causes a non-uniform pattern of light emission radially outward over the surface of said polymer element.

16. The apparatus that guides light from a light source to a target areaway from the light source of claim 1 wherein said scattering element causes light to be emitted from one or more distinct areas over the surface of said polymer element.

17. The apparatus that guides light from a light source to a target areaway from the light source of claim 1 wherein said scattering element causes light to be emitted in a single side-firing mode.

18. The apparatus that guides light from a light source to a target areaway from the light source of claim 1 wherein said scattering element causes light to be emitted in a dual side-firing mode.

19. The apparatus that guides light from a light source to a target areaway from the light source of claim 1 wherein said scattering element comprises a roughened surface of said polymer element.

20. The apparatus that guides light from a light source to a target areaway from the light source of claim 1 wherein said scattering element comprises a roughened surface of said polymer element, said roughened surface having scattering sites, the density of scattering sites being varied over the surface to control the spatial light distribution.

21. The apparatus that guides light from a light source to a target areaway from the light source of claim 1 wherein said scattering element comprises a roughened surface of said polymer element, the surface being roughened in one or more discrete zones.

22. The apparatus that guides light from a light source to a target areaway from the light source of claim 1 wherein said scattering element comprises light scattering particles.

23. The apparatus that guides light from a light source to a target areaway from the light source of claim 1 wherein said scattering element comprises light scattering particles, said light scattering particles having a substantially different refractive index than said polymer element.

24. The apparatus that guides light from a light source to a target areaway from the light source of claim 1 wherein said scattering element comprises light scattering particles, said light scattering particles having a substantially different refractive index than said polymer element such as single core emulsion polymers, core-shell emulsion polymers, hollow core emulsion polymers, or mineral particles.

25. The apparatus that guides light from a light source to a target areaway from the light source of claim 1 wherein said scattering element comprises light scattering particles, said light scattering particles having a substantially different refractive index than said polymer element and comprising a particulate material of a size capable of scattering light predominantly at a 90° angle.

26. The apparatus that guides light from a light source to a target areaway from the light source of claim 1 wherein said polymer element comprises a polymer system with a matrix phase and a second phase and wherein said scattering element comprises said second phase resulting from phase separation during polymerization, cure, loss of solvent exposure to nonsolvent, or change in temperature, said second phase having a substantially different refractive index than said matrix phase, said polymer system being a physical blend or copolymer.

27. The apparatus that guides light from a light source to a target areaway from the light source of claim 1 wherein said scattering element comprises light scattering particles, said light scattering particles having a substantially different refractive index than said polymer element and being dispersed throughout said polymer element.

28. The apparatus that guides light from a light source to a target areaway from the light source of claim 1 wherein said scattering element comprises light scattering particles, said light scattering particles having a substantially different refractive index than said polymer element, said light scattering particles being localized in a coating layer over said polymer element.

29. The apparatus that guides light from a light source to a target areaway from the light source of claim 1 wherein said scattering element comprises both a roughened surface of said polymer element and light scattering particles.

30. The apparatus that guides light from a light source to a target areaway from the light source of claim 1 including an opaque layer over one or more discrete areas on the surface of said polymer element to control the spatial light distribution.

31. The apparatus that guides light from a light source to a target areaway from the light source of claim 1 including a reflective layer over one or more discrete areas on the surface of said polymer element to control the spatial light distribution.

32. The apparatus that guides light from a light source to a target areaway from the light source of claim 1 including a layer containing liquid crystalline core particles over one or more discrete areas on the surface of said polymer element to modulate the spatial light distribution by modulating the orientation of the liquid crystals to transmit or block light.

33. The apparatus that guides light from a light source to a target area away from the light source of claim 1 wherein said light transmitting polymer element comprises a shape memory polymer element said shape memory polymer element comprising a solid shape memory polymer body or a porous foam shape memory polymer body or a porous foam shape memory polymer body about a solid shape memory polymer body, and wherein said shape memory polymer element can be formed into a primary or equilibrium shape, re-formed into a stable secondary or stressed shape, and actuated by heat to recover its primary shape.

34. The apparatus that guides light from a light source to a target area away from the light source of claim 1 wherein said light transmitting polymer element comprises a shape memory polymer element said shape memory polymer element comprising a solid shape memory polymer body or a porous foam shape memory polymer body or a porous foam shape memory polymer body about a solid shape memory polymer body, and wherein said shape memory polymer element can be formed into a primary or equilibrium shape, re-formed into a stable secondary or stressed shape, and actuated by heat to recover its primary shape, said secondary shape being a straight rod shape and said primary shape being a curved loop shape.

35. The apparatus that guides light from a light source to a target area away from the light source of claim 1 wherein said light transmitting polymer element comprises a shape memory polymer element, said shape memory polymer element comprising a solid shape memory polymer body or a porous foam shape memory polymer body or a porous foam shape memory polymer body about a solid shape memory polymer body, and wherein said shape memory polymer element can be formed into a primary or equilibrium shape, re-formed into a stable secondary or stressed shape, and actuated by heat to recover its primary shape, said secondary shape being a closed straight rod shape and said primary shape being an open "grappling hook" shape comprised of two or more prongs.

36. The apparatus that guides light from a light source to a target area away from the light source of claim 1 wherein said light transmitting polymer element comprises a shape memory polymer element, said shape memory polymer element comprising a solid shape memory polymer body or a porous foam shape memory polymer body or a porous foam shape memory polymer body about a solid shape memory polymer body, and wherein said shape memory polymer element can be formed into a primary or equilibrium shape, re-formed into a stable secondary or stressed shape, and actuated by heat to recover its primary shape, the direction of light emission dynamically changing as said shape memory polymer element changes shape.

37. The apparatus that guides light from a light source to a target area away from the light source of claim 1 wherein said light transmitting polymer element comprises a shape memory polymer element, said shape memory polymer element comprising a solid shape memory polymer body or a porous foam shape memory polymer body or a porous foam shape memory polymer body about a solid shape memory polymer body, and wherein said shape memory polymer element can be formed into a primary or equilibrium shape, re-formed into a stable secondary or stressed shape, and actuated by heat to recover its primary shape, the surrounding environment providing said heat.

38. The apparatus that guides light from a light source to a target area away from the light source of claim 1 wherein said polymer element comprises a shape memory polymer element said shape memory polymer element comprising a solid shape memory polymer body or a porous foam shape memory polymer body or a porous foam shape memory polymer body about a solid shape memory polymer body, and wherein said shape memory polymer element can be formed into a primary or equilibrium shape, re-formed into a stable secondary or stressed shape, and actuated by heat to recover its primary shape, the light from said light source being converted to said heat by absorption of the light by said shape memory polymer element.

39. The apparatus that guides light from a light source to a target areaway from the light source of claim 1 wherein said polymer element comprises a shape memory polymer element, said shape memory polymer element comprising a solid shape memory polymer body or a porous foam shape memory polymer body or a porous foam shape memory polymer body about a solid shape memory polymer body, and wherein said shape memory polymer element can be formed into a primary or equilibrium shape, re-formed into a stable secondary or stressed shape, and actuated by heat to recover its primary shape, the light from said light source being converted to said heat by light absorbing dye or light absorbing particles embedded in or coated on said shape memory polymer element, said light absorbing dye or light absorbing particles being uniformly dispersed.

40. The apparatus that guides light from a light source to a target areaway from the light source of claim 1 wherein said polymer element comprises a shape memory polymer element, said shape memory polymer element comprising a solid shape memory polymer body or a porous foam shape memory polymer body or a porous foam shape memory polymer body about a solid shape memory polymer body, and wherein said shape memory polymer element can be formed into a primary or equilibrium shape, re-formed into a stable secondary or stressed shape, and actuated by heat to recover its primary shape, the light from said light source being converted to said heat by light absorbing dye or light absorbing particles embedded in or coated on said shape memory polymer element the concentration of said light absorbing dye or light absorbing particles being varied to control the spatial heat distribution.

41. The apparatus that guides light from a light source to a target areaway from the light source of claim 1 wherein said polymer element comprises a shape memory polymer element, said shape memory polymer element comprising a solid shape memory polymer body or a porous foam shape memory polymer body or a porous foam shape memory polymer body about a solid shape memory polymer body, and wherein said shape memory polymer element can be formed into a primary or equilibrium shape, re-formed into a stable secondary or stressed shape, and actuated by heat to recover its primary shape, the light from said light source being converted to said heat by light absorbing dye or light absorbing particles embedded in or coated on said shape memory polymer element, said light absorbing dye or light absorbing particles being locally confined to permit localized heating.

42. An apparatus that guides light from a light source to a target area away from the light source, comprising:
  an optical fiber, said optical fiber having a light transmitting core, a cladding layer about the core, a proximal end, and a distal end, the proximal end of the optical fiber being coupled to the light source,
  a light transmitting polymer element comprised of a shape memory polymer, said light transmitting polymer element comprised of a shape memory polymer operatively connected to the distal end of said optical fiber, and wherein said light transmitting polymer element comprised of a shape memory polymer is comprised of a scattering light diffusing element incorporated with said light transmitting polymer element comprised of a shape memory polymer to diffuse light radially outward from said light transmitting polymer element.

* * * * *